(12) United States Patent
Pajo

(10) Patent No.: US 12,190,753 B2
(45) Date of Patent: Jan. 7, 2025

(54) METHODS, SYSTEMS, DEVICES, AND SOFTWARE FOR MANAGING AND CONVEYING KNOWLEDGE

(71) Applicant: Erind Pajo, New York, NY (US)

(72) Inventor: Erind Pajo, New York, NY (US)

( * ) Notice: Subject to any disclaimer, the term of this patent is extended or adjusted under 35 U.S.C. 154(b) by 0 days.

(21) Appl. No.: 18/534,316

(22) Filed: Dec. 8, 2023

(65) Prior Publication Data
US 2024/0185734 A1 Jun. 6, 2024

Related U.S. Application Data

(63) Continuation of application No. 16/297,035, filed on Mar. 8, 2019, now Pat. No. 11,869,385.

(60) Provisional application No. 62/640,551, filed on Mar. 8, 2018.

(51) Int. Cl.
*G09B 7/00* (2006.01)
*G06F 40/284* (2020.01)
*G06F 40/30* (2020.01)

(52) U.S. Cl.
CPC ............. *G09B 7/00* (2013.01); *G06F 40/284* (2020.01); *G06F 40/30* (2020.01)

(58) Field of Classification Search
CPC .......... G09B 7/00; G06F 40/284; G06F 40/30
See application file for complete search history.

(56) References Cited

U.S. PATENT DOCUMENTS

| | | |
|---|---|---|
| 2004/0111386 A1 | 6/2004 | Goldberg |
| 2008/0254425 A1 | 10/2008 | Cohen |
| 2011/0270607 A1 | 11/2011 | Zuev |
| 2015/0081277 A1 | 3/2015 | Behi |
| 2015/0220852 A1 | 8/2015 | Hatami-Hanza |
| 2016/0012122 A1 | 1/2016 | Franceschini |

*Primary Examiner* — Kesha Frisby
(74) *Attorney, Agent, or Firm* — Nemphos Braue LLC; Michael Antone

(57) ABSTRACT

The present invention manages knowledge through elementary knowledge units and systematized inventories of bodies of knowledge comprised of interrelated elementary knowledge units extracted from instances of articulation including visual (text & image), audio, or other sensory instances. These elementary knowledge unit outputs may be constellated to reflect compositional dynamics of a body of knowledge. Conveying knowledge and assessing mastery may be mediated through non-human identities of virtual teachers that appear to converse in natural language, through adaptation of verbalizations to learners, as well as through conversational frameworks. Individually as well as in integration; and embodied for example through computerized processing, artificial intelligence, one or more human agents, including in various combinations; the aspects of the invention are useful especially for enabling the comprehension and the absorption of knowledge that is provisional and progressive in nature, including, but not limited to, scientific knowledge.

20 Claims, 32 Drawing Sheets

Assessing Knowledge Mastery, Discovering Knowledge gaps

Determine occurrences of words and phrases in information from an information source,
Identify elementary particulars in the information,
Determining constellations of related elementary particulars based on a relative proximity of the elementary particulars and occurrences in the information;
Compare the elementary particulars and constellations for the information source to a knowledge repository;
Identify the elementary particulars and constellations not present in the knowledge repository;
Store the identified elementary particulars and constellations for the information source in the knowledge repository associated with the information source.

FIG. 17

Determining occurrences of words and phrases in information from an information source, Identifying elementary particulars in the information, the elementary particulars including the words and phrases with the most occurrences in the information;

Determining constellations of related elementary particulars based on a relative proximity of the elementary particulars and occurrences in the information;

Defining at least first and second degrees of constellations of elementary particulars for each elementary particular based on the relative proximity of the elementary particulars and occurrences in the information; and Storing elementary particulars associated with content pertaining to each elementary particular and its first degree elementary particulars.

FIG. 18

Asking a first question concerning a first elementary particular;
Retrieving all first degree elementary particulars associated with the first elementary particular;
Receiving a first response to the first question;
Determining the retrieved first degree elementary particulars not present in the first response; and
Asking further questions in which expected responses include the retrieved first degree elementary particulars not present in the first response,
Receiving further responses to the further questions
Retrieving content to explain first degree elementary particulars missing from the expected responses
Providing the content to a learner.

FIG. 19

Receiving a first question;
Identifying elementary particulars in the first question;
Retrieving at least one of first content or first
 constellations associated the elementary
 particulars in the first question from a first
 database;
Retrieving at least one of second content or second
 constellations associated the elementary
 particulars in the first question from a second
 database;
Comparing at least one of the first and second content
 and the first and second constellations; and
Identifying the elementary particulars and constellations
 not present in both the first and second content
 and first and second constellations.

FIG. 20

METHODS, SYSTEMS, DEVICES, AND SOFTWARE FOR MANAGING AND CONVEYING KNOWLEDGE

CROSS-REFERENCE TO RELATED APPLICATIONS

This application is a continuation of U.S. patent application Ser. No. 16/297,035 filed Mar. 8, 2019, which claims the benefit of and priority to U.S. Provisional Patent Application No. 62/640,551 filed Mar. 8, 2018, the disclosure of each is incorporated herein by reference in its entirety.

BACKGROUND OF THE INVENTION

Field of the Invention

The present invention relates in general to managing and conveying information and more specifically to methods, systems, devices, and software for managing and conveying knowledge and interactive education.

Background Art

The benefits of mastering knowledge, specifically scientific knowledge, are both well documented and well known: earning power practically doubles merely by obtaining a college degree; mastering merely certain subsections of advanced knowledge in an engineering or biomedical field multiplies that earning power several times over. Yet statistics show that advanced and scientific knowledge is often too hard to master: 41% of all American undergraduates fail to graduate from college even after 150% of the time that it should take them to do so; only 3% of associate degrees are in engineering fields; fewer than 6% of bachelor's degrees are in biological sciences. The high and accelerating pace of research/publication makes it also increasingly difficult for even highly educated professionals to keep on top of even compartmentalized fields of knowledge.

The massive failure to master advanced knowledge, including especially science, or to remain on top of a given field for long, may be rooted in the inherent incongruities between advanced knowledge and learning. Science, by definition, is knowledge that can always change depending upon (the evolving measuring of) empirical evidence. Humans, on the other hand, learn by fixing knowledge into the biological substrata of our neural pathways. Over time, the expanse of scientific knowledge not only changes but also continuously expands. By contrast, our cognitive ability to learn, rooted as it is in our biology, does not continuously expand but plateaus and eventually begins to decline. To succeed at mastering science, or other knowledge that is provisional in nature or that expands, we need at a minimum to mediate such key incongruities. But the advanced learning protocols that we have in place massively fail to achieve such mediation, whether embodied in the academic course, which is typically the creation and implementation of the individual teacher, or in course entailments such as textbooks. Current knowledge dissemination and management protocols, such as those embodied for example in the practices of peer-reviewed journals and learned presses, academic libraries and scholastic databases, web search, etc., reinforce or exacerbate these failures. Altogether, the current state of the art fails at rendering reliably to a human user/learner advanced and advancing knowledge in its up-to-date state; it fails at making the knowledge discoverable, accessible, absorbable; it fails at providing for learning that convenes with the learner's individual needs/circumstances.

The consequent failure to utilize advanced/advancing knowledge affects both the individual and the larger society. Given that ineffectualities and inefficiencies of current protocols such as enumerated above may contribute significantly to this net state of affairs, there is now significant need for improvement in systematizing, managing, and conveying knowledge.

BRIEF SUMMARY OF THE INVENTION

The present invention comprises a new technology for knowledge management and for education that focuses on solving the contradictions between the provisional and expansionary nature of knowledge and the cognitive reinforcement requisites of human learning. This technology models knowledge as interrelated elementary knowledge units ("EKUs").

An EKU is an articulation of knowledge, such as a statement, irrespective of its validity. EKUs may be embodied in varied lexical forms. The invention operationalizes the EKU through lexical forms that are pithy articulations of knowledge that are semantically equivalent to and representative of other possible lexical forms of the knowledge.

A Body of Knowledge ("BOK") is an interrelated collection of EKUs that satisfy one or more knowledge constraints. A knowledge constraint is any limitation placed on any aspect of knowledge, such as subject matter, etc.

New knowledge may confirm (repeat), modify, nullify, or augment (expand) extant EKUs and/or constellations of EKUs, or BOKs. The methods, systems, devices, and software disclosed hereinafter granulate the full scope of knowledge systematization, conveyance, and assessment to enable new forms of understanding and learning. The new knowledge may truly be new, that is developed, or may be knowledge that is new to the system, such as encountered first in a new instance of articulations.

In various embodiments, aspects of the present invention may be embodied by one or more agents, whether human or machine-animated; who; with or without employing other tools/aids and/or additional computerized processing; may apply various aspects of the invention to particularize a given body of knowledge into pithy articulations of the elementary units that such body of knowledge comprises; may further catalog, annotate, and/or store these knowledge granules; may further update them, for example to reflect knowledge advancement, etc.; may further communicate or commercialize them through any range of means or channels, such as oral communication (e.g., tutoring), physical embodiment including electronic publication (e.g., printed/recorded study aids), interactive rendering (e.g., online databases, mobile apps), and more.

Various methods, devices, non-transitory computer readable medium carrying instructions to be executed by one or more processors, and/or systems of the present invention may include defining a BOK by one or more knowledge constraints, obtaining a plurality of IOAs meeting the knowledge constraint, forming a textual corpus from the IOAs, identifying EKUs in the textual corpus, and, generating an inventory of the EKUs based on occurrences of the EKUs, and their relative proximity to other EKUs, in the textual corpus. Various aspects of the invention may be performed by a user and/or processor in a machine depending upon the implementation.

One/more additional instances of articulations may be added to the textual corpus and the inventory may be regenerated or a separate inventory may be generated for the additional IOAs, which may be added to the inventory of the BOK (i.e., the systematized inventory of the BOK ("SIBOK")). EKUs may be compared to determine whether the two EKUs are different lexical forms, including language variations, of one selfsame semantic representation and can be represented by one of the EKUs or another EKU.

How an IOA relates to one/more EKUs/SIBOKs may serve as an abstract of the IOA. Additionally, EKUs occurring in an IOA may also serve as an abstract of the IOA. The inventory of a BOK may be regenerated at regular intervals or as desired by the skilled artisan. EKUs may be associated with bibliographic information of the IOAs, so that IOAs containing the EKUs may be referenced if desired.

As new IOAs are consumed, it may be desirable to define one or more new BOKs, if the new IOAs include EKUs that are not present in existing BOKs/SIBOKs. Within the BOK/SIBOK various constellations representing the interrelationship of the EKUs may be defined based on the relative occurrence and proximity of the various EKUs.

A user and/or processor may be requested to articulate a first elementary knowledge unit in a body of knowledge. The system may receive and analyze a first response to the request to determine whether the EKU is present in the first response. If the first EKU is not present, user/processor may be requested to rearticulate the first EKU. If present, the user/processor may be requested to articulate a second EKU from the body of knowledge, where the second EKU is constellated with the first EKU. The request may be generated in natural language and in accordance with a conversational framework that may be centered on imparting and/or assessing mastery of EKUs/BOKs and employing adaptations of verbalization to provide alternative EKU verbalization to the user, which may be based on user preferences.

The system of the present invention may be animated as a suite of virtual teachers that assists a learner with discovering, understanding, and ultimately mastering knowledge through conversational exchanges in natural language based on the EKUs and constellations. Such suite may include interconnected artificial intelligence frameworks that particularize/modulate, and/or systematize, and/or compare, and/or update, and/or articulate/conversationalize knowledge. While the system may usually be directed toward learning by a human, a learner in the context of the present invention may include other devices and systems including processors and other entities capable of learning.

For example, the system may include one or more of Knowledge Learning Interchange Cores ("KLIC"), Conversational Teaching Cores ("CTC"), Learner Registry Cores ("LRC"), and Commercial Deployment Cores ("CDC"), to convey knowledge in the form of EKUs to the user as well as to receive and to process the user's interactions. The KLIC also stores and maintains the knowledge repositories that have been accumulated by the system as EKUs and BOKs for the edification of the users of the system. The CTC accesses EKUs from the KLIC and provides the EKUs as desired by the user, such as in adaptive conversational style, via the CDC, which provides the system's outputs to the user's physical interface and mediates the user's inputs to the system. The LRC maintains the individual learning and preference profiles of users, so the CTC and CDC will present relevant system outputs in forms desired by users.

While the greatest needs for this technology may lie in the advanced scientific fields where knowledge is tangibly provisional and expansive, the invention is directed towards any type of knowledge, agnostic of topical field, such as employment-oriented or leisure learning, for advancing mastery of news-related information, and more.

BRIEF DESCRIPTION OF THE DRAWINGS

The accompanying drawings are included for the purpose of exemplary illustration of various aspects of the present invention, and not for purposes of limiting the invention, wherein:

FIGS. 2-23 illustrate exemplary aspects of various of the methods, systems, and devices of the invention.

Figure 1:
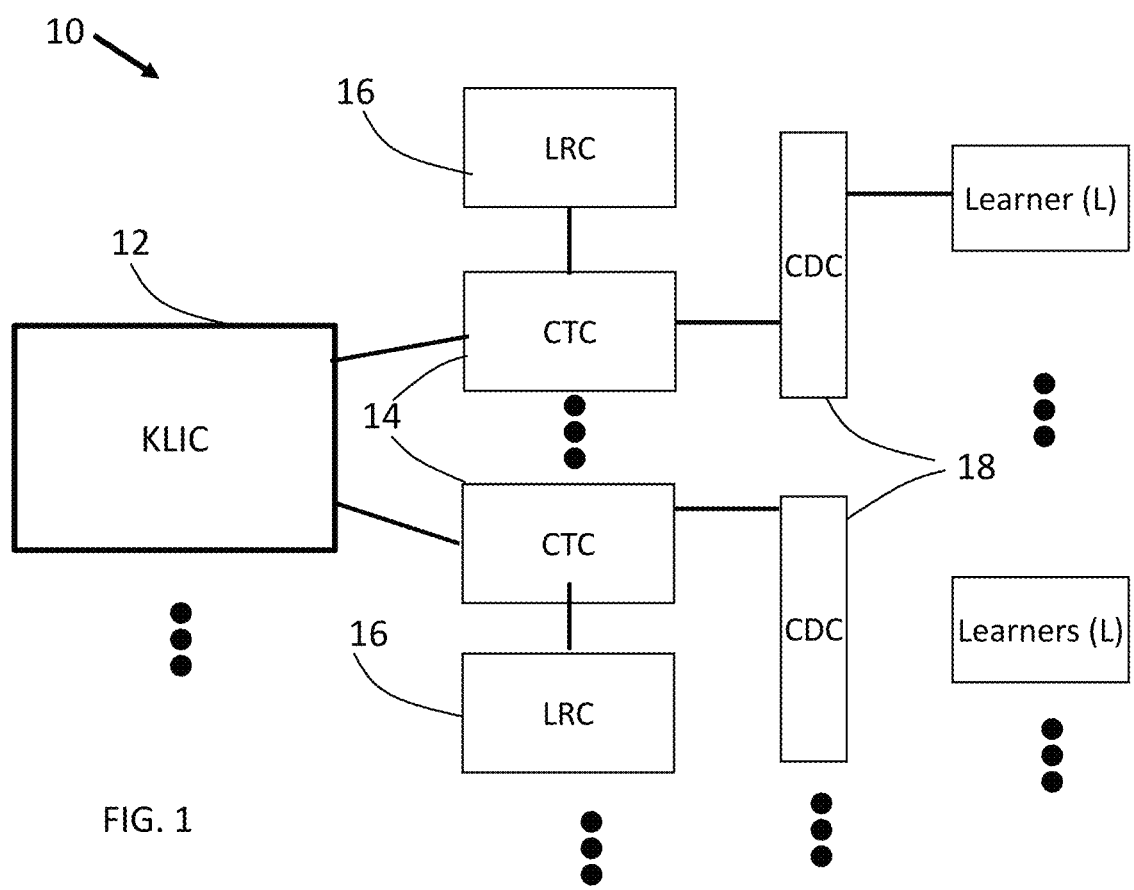
FIG. 1 illustrates exemplary embodiments of the system.

The various exemplary embodiments, processes, and methods of the invention illustrated in the drawings may, in practice, involve also one or more stages of processing and/or one/more processes that may be implied in the drawings and/or abbreviated in the illustrations such as by way of condensed icons and/or by text used in iconographic capacity, and wherein such various practice embodiments may also involve instructions and/or software that includes code/instructions generated by one/more processors through processes that are commonly referred to by artisans as "machine learning" (including "deep learning," techniques such as "back propagation," etc.) as well as any number of "layers" of hardware/firmware/software implementations of certain properties that are commonly referred to by artisans as "neurons," "neural networks," etc., including when such may be spread, distributed, assembled, etc. over one/more networks and/or cloud services at various stages.

In the drawings and detailed description, the same or similar reference numbers may identify the same or similar elements. It will be appreciated that the implementations, features, etc. described with respect to embodiments in specific figures may be implemented with respect to other embodiments in other figures, unless expressly stated, or otherwise not possible.

DETAILED DESCRIPTION OF THE INVENTION

Methods, systems, devices, and software of the present invention are described herein by way of example and otherwise and without loss of generality to the claimed invention and without imposing limitations upon it. The inventor acknowledges Judi Pajo for discussing the current state of the art in computerized statistical processing of textual data.

Underlying embodiments of the present invention is a vision and model of knowledge as an expanse of elementary knowledge units ("EKUs"). An EKU is an articulation of knowledge, such as a statement, irrespective of the EKU's validity. For example, "the world is flat" and "the world is not flat" are EKUs that embody contradictory semantic representations; each EKU puts into words knowledge that contradicts the knowledge that the other EKU puts into words. The first EKU may have generally been considered true until Columbus, the second EKU has generally been considered true since after Columbus.

In the case of science, the EKUs may be primarily about the workings of the empirical world. EKUs may encompass in semantic scope the ways and means through which scientific propositions may be established (i.e., research methodology); they may encompass in semantic scope such propositions' respective merits or failings and advancements; they may encompass in semantic scope additional information related to various aspects of the above, additional information about the individuals involved therewith; etc.

EKUs may be embodied in varied lexical forms. The invention uniforms the EKU through lexical forms that are pithy articulations of knowledge that are semantically equivalent to and representative of other possible lexical forms. For example, an EKU may take the form "biology is the study of living organisms," which may represent the uniforming of articulations that are semantic equivalents, but lexical inequivalents, such as "biology studies life," "the science of biology deals with living things," "biology is the science of living organisms," etc.

A BOK is an interrelated collection of EKUs that satisfy one or more knowledge constraints. A knowledge constraint is any limitation placed on any aspect of knowledge. Examples of knowledge constraints that help define a BOK include subject matter (e.g., biology, inorganic matter, living organisms, etc.), the manner through which knowledge is produced or pursued (e.g., research methodology or philosophical inference, etc.), the agents who produce or pursue knowledge (e.g., a research scientist, a cohort of authors of a particular stylistic inclination, an empirical observer, etc.), the linguistic and other conventions and/or formats of the instances in which the EKUs and/or the BOK may be embodied (e.g., research reports or, comparative monographs, etc.), the language in which knowledge is articulated, (e.g., English, Dutch, etc.), time period(s), locations, etc. For example, "English-language research papers published on Jan. 1, 2019," "original research papers published in peer-reviewed journals," "formal fashion wear in Vietnam," "books on Immanuel Kant that are longer than 300 pages and were published before 1950," "soccer by seniors," etc., all represent combinations of knowledge constraints that the invention can use for confining a BOK.

Subject matter should be broadly understood to include, but is not limited to, any subject and/or object of knowledge, and/or any topic and/or concept and/or field of knowledge, such as, for example, "the solar system," "early gaming systems," "postmodernism in Nevada," "geophysics," "emotional development," "New York City," etc.

EKUs may also be referred to as "knowledge particulars," "semantic particulars," "elementary semantic particulars," "semantic representations," etc. that take shape in language, such as in various sequences of words. The EKUs that comprise a BOK and their interrelationships may be constantly evolving, as knowledge evolves, as new articulations of knowledge emerge, and, in the present invention, also as new articulations and information may be identified from sources and added to a BOK.

FIG. 1 generally illustrates exemplary systems 10 and methods of the present invention in which the inventive aspects may function including one or more of Knowledge Learning Interchange Cores ("KLIC") 12, Conversational Teaching Cores ("CTC") 14, Learner Registry Cores ("LRC") 16, and Commercial Deployment Cores ("CDC") 18, interacting with one or more learners ("L") via one or more interfaces for natural language exchange (sound/voice/text/visual) as well as other sensory/haptic etc. interfaces. It will be easily appreciated that, in this era of cloud-based distributed computing and storage, the term "core" generally refers to a core function or set of functions that may be physically implemented locally in one site or globally, as well as involve various levels of integration, disintegration, coordination, etc., and operate synchronistically or anachronistically, serially or in parallel, in real-time or in periodic or fragmentary tandem, etc.

As will be further described below, the KLIC 12 also include one or more repositories of system 10 outputs and/or other information, as EKUs and BOKs etc., that have been accumulated by the system 10 for the edification of users of the system 10. The CTC 14 accesses EKUs from KLIC 12 and provide them to a user in formats desired by the user, such as in conversational style, via the CDC 18, which may serve and provide the physical interfaces to the user. The LRC maintain individual user learning and preference profiles, so the CTC and CDC will present relevant natural language outputs and knowledge to the user in adaptations relevant to the user and in forms desired by the user. Each of these functions will expand and evolve with advances in knowledge, technology, as well as with better understanding of the user.

Elementary Knowledge Units (EKUs)

In the present invention, the EKU is the basic element that is produced and maintained in the KLIC 14 of the system 10. The invention's granulation and systematization of knowledge into EKUs represents a fundamental shift in how knowledge is treated, stored, and conveyed for utilization. The EKU is a pithy articulation of a particular unit of knowledge that may be consumed by a human or a machine; that may be interrelated with other EKUs; that may be managed and updated; that may be conveyed in various lexical forms, individually as well as together with other EKUs; so as to enable improved understanding and learning.

For example, a BOK related to knowledge that is colloquially known as "biology" may include among many others the EKU "biology is the study of living organisms." This EKU is semantically equivalent to various alternative word sequences that express the same meaning (in other words: it is semantically equivalent to various lexical inequivalents), such as "biology studies life," "the science of biology deals with living things," "biology is the science of living organisms," that may also occur in various instances in which the BOK is articulated. Among the EKUs that may be related and constellated with the above EKU are EKUs that share semantic concepts and/or may involve the words "living" or "organism," for example EKUs such as "organisms include plants and animals," "living and non-living are states of existence," "living is a state of existence that must be maintained by the organism," etc.

EKUs do not have a sovereign or designated existence or a physical counterpart in the prior art. For example, publishers do not publish or commercialize EKUs, colleges do not teach or grade them, students are not credentialed for mastery of EKUs, etc. Similarly, a body of knowledge is an ambiguous and general label in the prior art placed on a general field, discipline, or industry, but in the present invention the body of knowledge may be defined as a group of interrelated EKUs. Furthermore, current protocols generally equate knowledge with the information source in which it is found. For example, the underlying premise of a web-based search engine is the matching of a search term to one or more documents on the web in which the search term occurs. By contract, the present invention actually produces, or generates, EKUs based on the various articulations that are present in various sources, which sources may otherwise not be relevant assuming that they have been sampled correctly.

In various embodiments, an information source that may be used for granulating EKUs may be referred to herein as an Instance of Articulations ("IOA"). As IOAs are consumed by system 10, EKUs are generated and interrelationships between the EKUs are determined and inventoried. The system 10 may identify BOKs that may be associated with articulations in IOAs. If no BOK is identified, the prominent EKUs in an IOA (e.g., the EKU occurring most frequently) may be used by the system 10 to establish a new BOK. If one or more BOKs are identified involving the EKUs, the information may be added to such BOKs by various methods generally so as to account for the EKUs and the EKU constellations within the IOA as relative to the EKUs and the EKU constellations within the BOK.

As articulations from the IOAs are consumed, the EKUs and EKU constellations may be annotated by the system 10 with bibliographic information, which may or may not be used in evaluating various aspects of the BOK. For example, it may be useful to query a BOK also based on this information.

EKU generation may be performed by human and/or computer agents, with the EKUs then being constellated via systematic inventorying, via cataloging, via annotating, etc. of the BOK. As will be further discussed, the reconstellating of EKUs may be a continual process that occurs as additional IOAs are added, or it may be also performed at various random and/or fixed intervals. Generally speaking, during the initial building out of a BOK, it may be desirable to automatically reconstellate the EKUs in the BOK as material is added for systematic processing, because the initially small number of IOAs may significantly vary the EKUs and/or constellations in the BOK. Over time, it may be desirable to reconstellate the BOK less frequently and/or in a curated manner to understand the impact of additional IOAs on the BOK.

It will be appreciated that a single EKU may be articulated in various lexical forms or verbal renditions. In addition, multiple EKUs may be consolidated into a single new or existing EKU with the other EKUs being associated with the EKUs. For example, a sequence of words such as "living organisms are studied in the field of biology" may be identified initially as a potentially new EKU, but may subsequently be rendered more pithily as "biology is the study of living organisms". It will be further appreciated that EKUs may be re-rendered or rearticulated over time as the common usage and terminology of the EKUs evolves. In addition, the alternative renditions of EKUs may be employed by the system 10 to aid in the learning process by adapting a conversational exchange to an individual learner's verbal/comprehension skill/ability/etc.

To illustrate, an embodiment of the invention may produce the EKU "feathers evolved before birds evolved" out of semantically equivalent alternative wordings such as "feathers evolved before the origin of birds," "feathers came before birds and flight," "primitive feathers are older than primitive birds," "bird and feather did not evolve together," "feathers evolved from reptile scales," etc. In an additional illustration, an embodiment of the invention may inventory an EKU in a concise rendition such as "all birds have one ancestor" as well as recognize, for example when assessing a learner's mastery of this EKU, its semantic equivalency to renditions such as "all birds share the same common ancestor," "for all living birds there was one last common ancestor," "common ancestor of all extant birds," etc.

Figure 2:
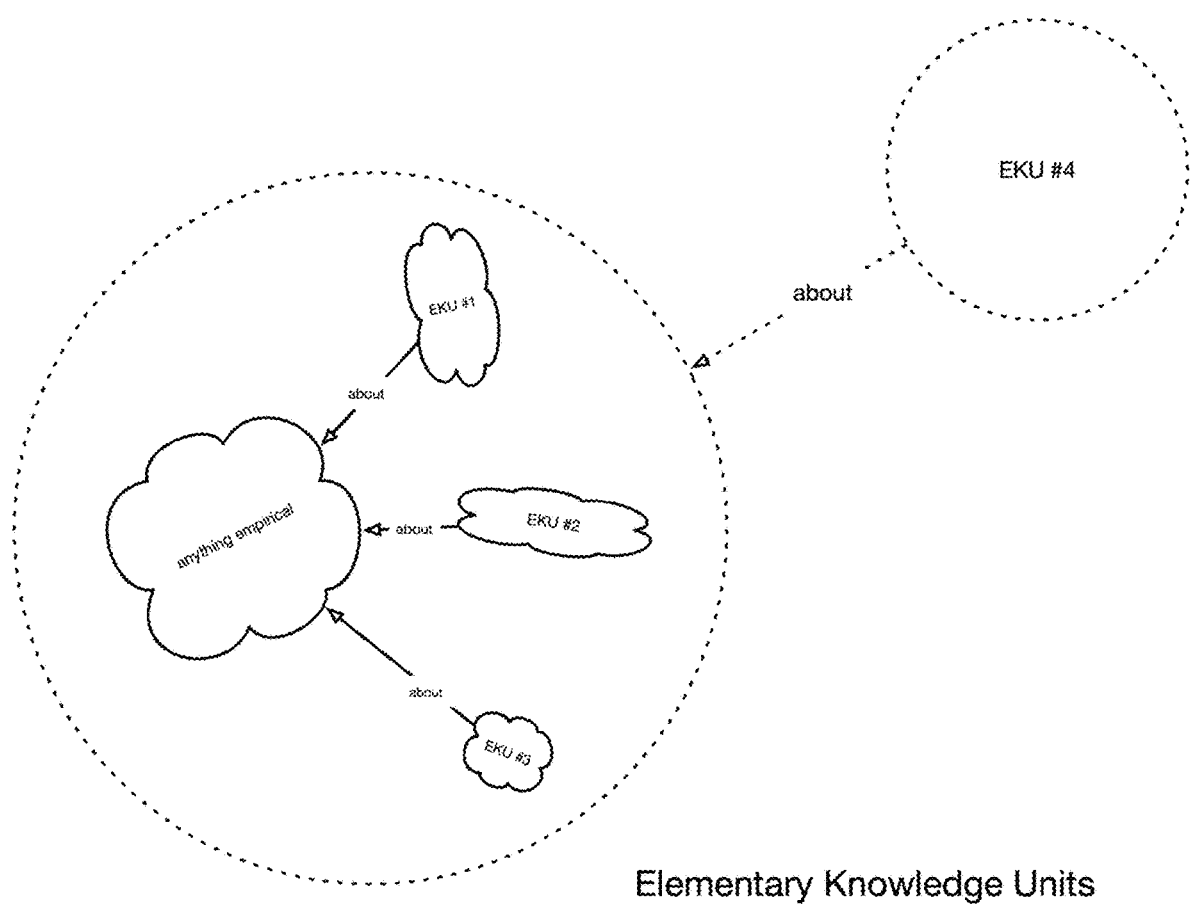

FIG. 2 provides a simplified illustration of potential relations between elementary knowledge units, EKU #1, EKU #2, EKU #3, and EKU #4. The first three EKUs are about "anything empirical," for example a microorganism, a solar system, or the feeling of happiness. EKU #4 may concern all three of them as well as the microorganism, solar system, or the happiness that they are about. The organization of FIG. 2 also illustrates the concept of sub-BOKs, in which interrelated EKUs within a BOK may be distinguishable from other EKUs within the BOK based on various features of the EKUs including bibliographic information.

Instances of Articulations (IOAs)

The present invention is not limited to any specific medium that may contain knowledge articulations and/or additional information relevant to EKUs and/or that may be used for processing BOKs. The IOAs can range from single visual (text & image), audio, or other sensory instances to the entire library of introductory books that may have been used over the years in an academic discipline.

Figure 3:
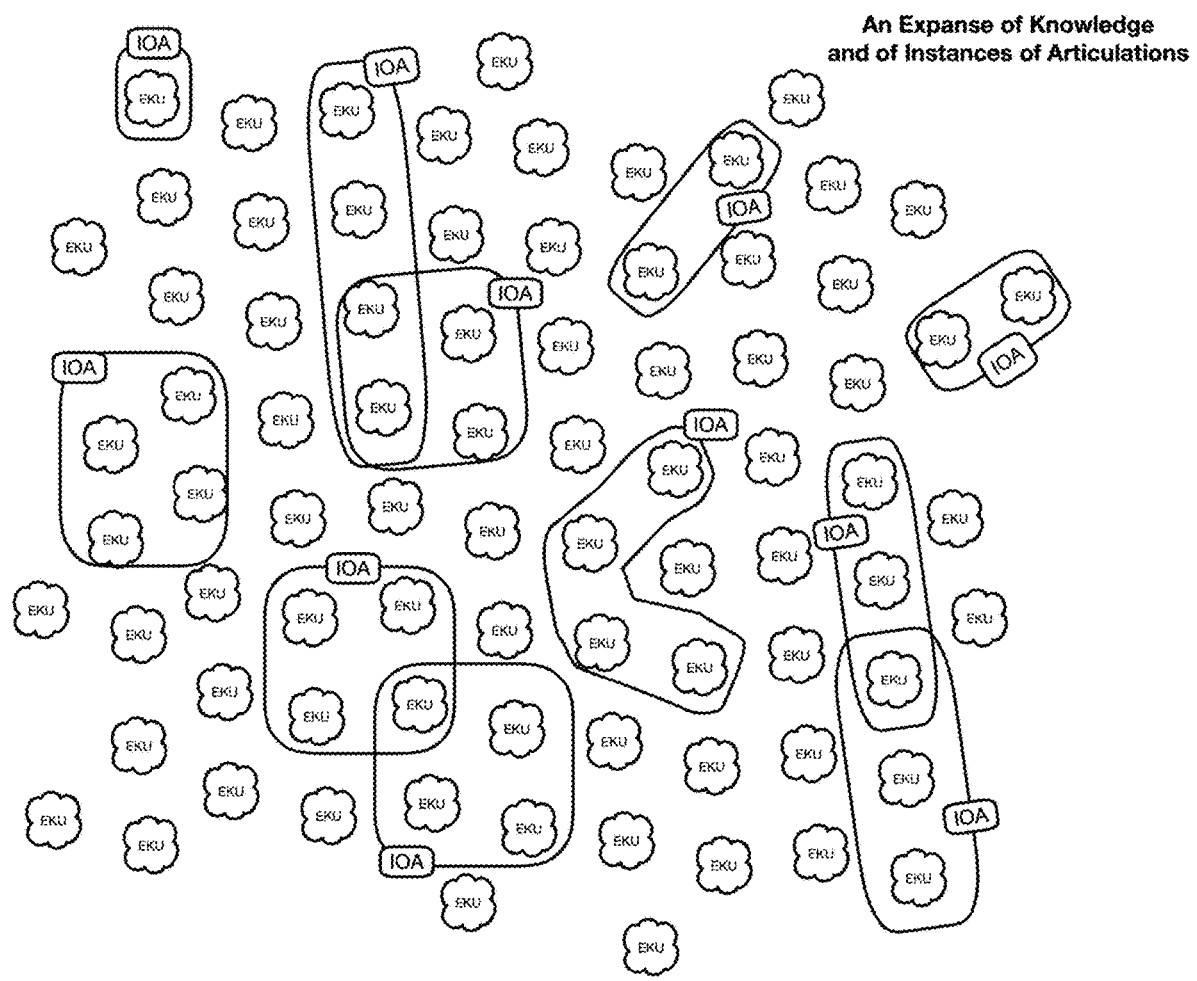

FIG. 3 provides a simplified illustration of how IOAs overlay in terms of the EKUs that they contain and/or in BOKs. It is within the scope of the invention for bibliographic information regarding IOAs to be associated with an EKU as desired. For example, the accuracy or truthfulness of an EKU may be confirmed in multiple IOAs; however, when bibliographic information regarding those IOAs is associated with the EKU, and that reveals that all of those IOAs are related to each other in certain ways, and/or that other IOAs that are not similarly related refute the accuracy or the truthfulness of the EKU, it may become clear to the user of the system 10 that the accuracy or the truthfulness of the EKU may be questionable.

Confining Bodies of Knowledge

The invention operationalizes the concept of "knowledge expanses" in several ways through the relationship of EKUs within and across BOKs. While BOKs are defined relative to the EKUs, EKUs may reside within various BOKs that may intersect, such as biology and chemistry, as well as sub-BOKs that reside within a broader BOK, such as 2018 biology scientific journal publications.

Figure 4:
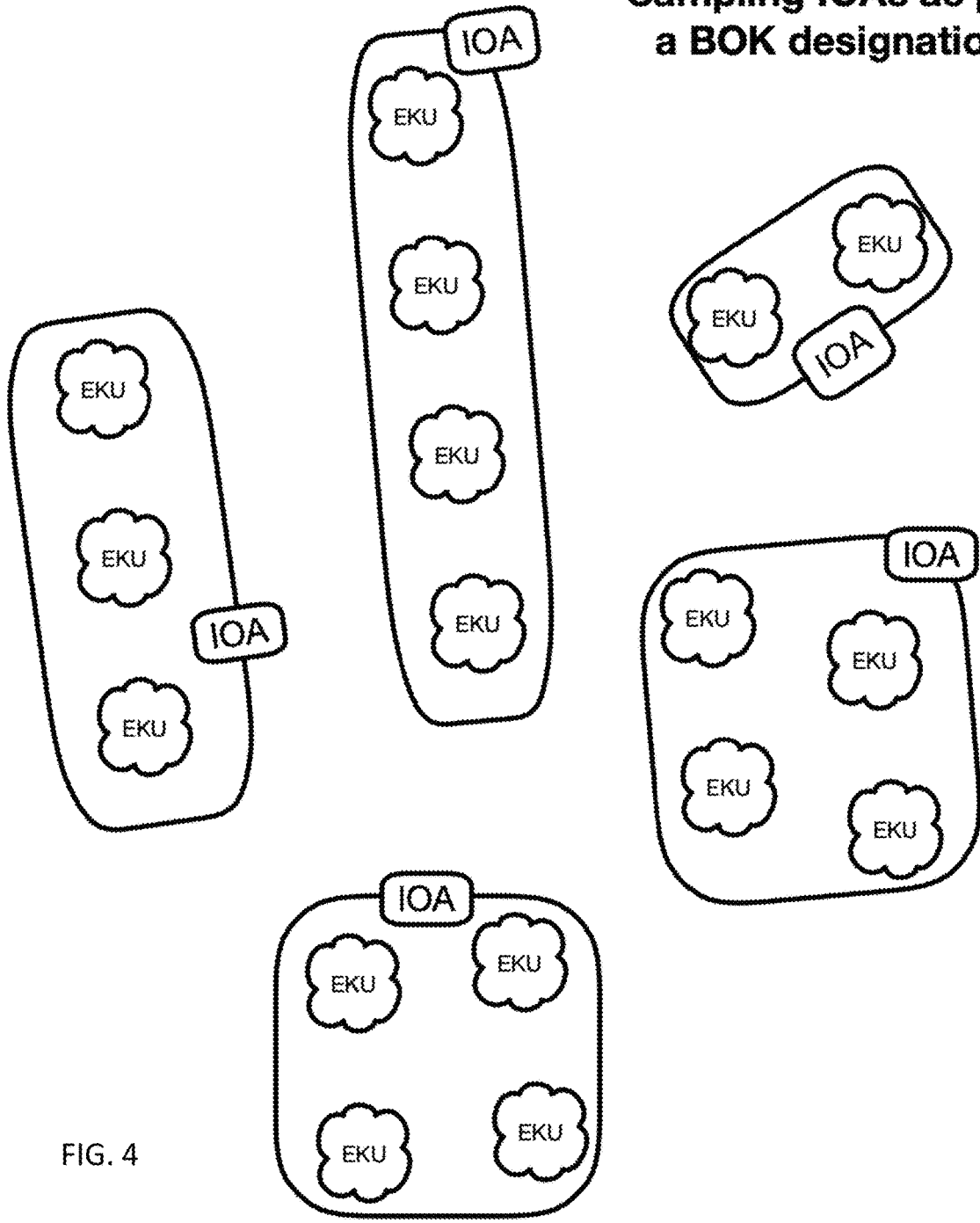
Figure 5A:
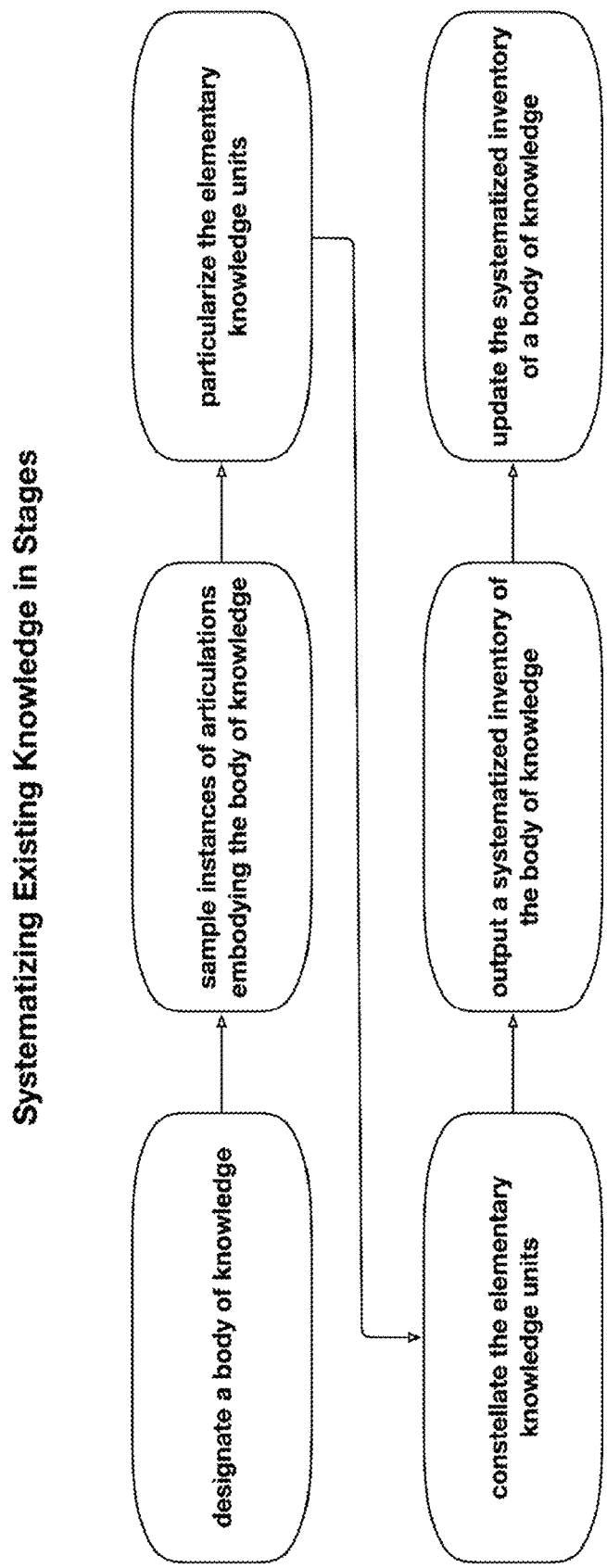
Figure 5B:
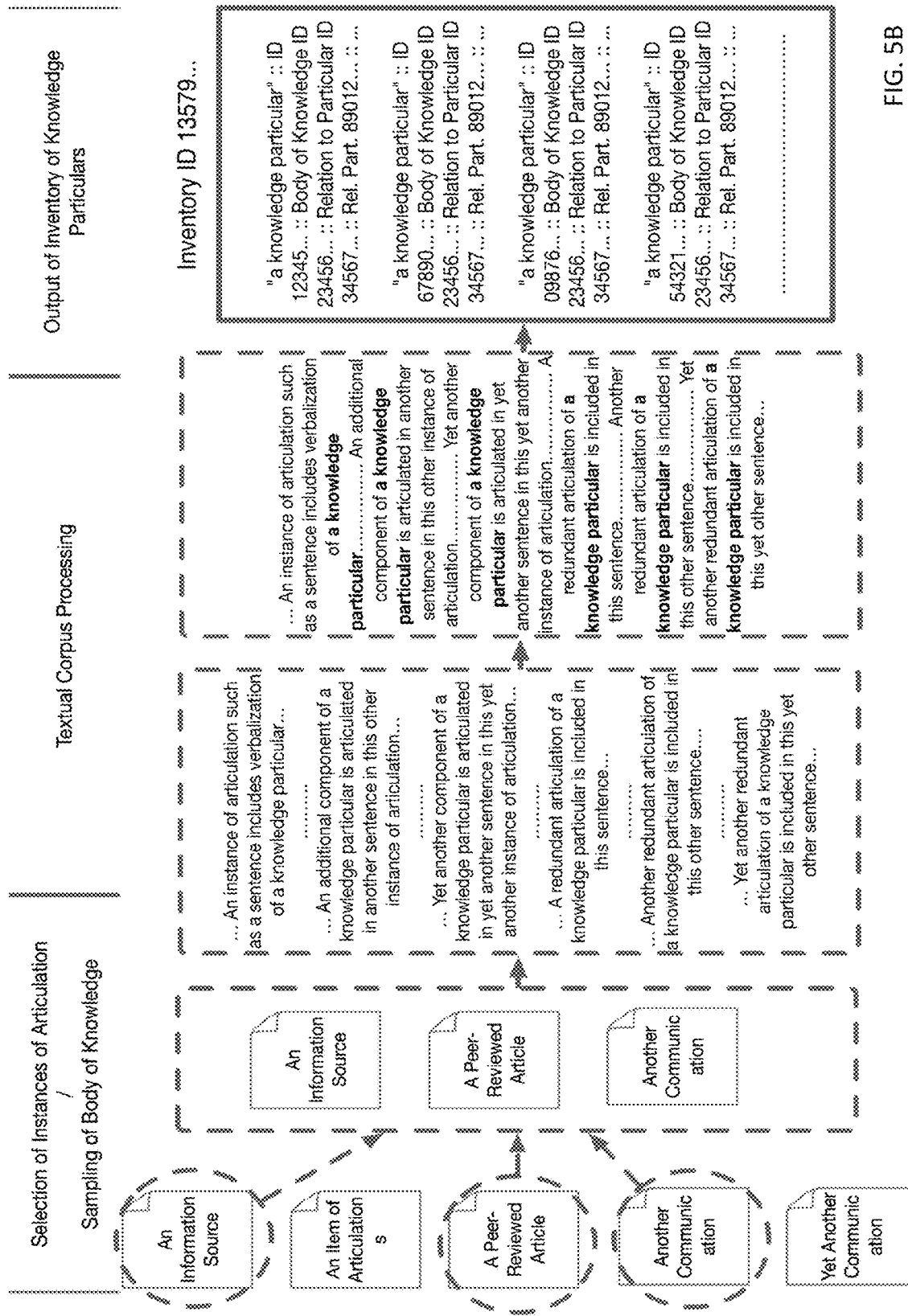
Figure 5C:
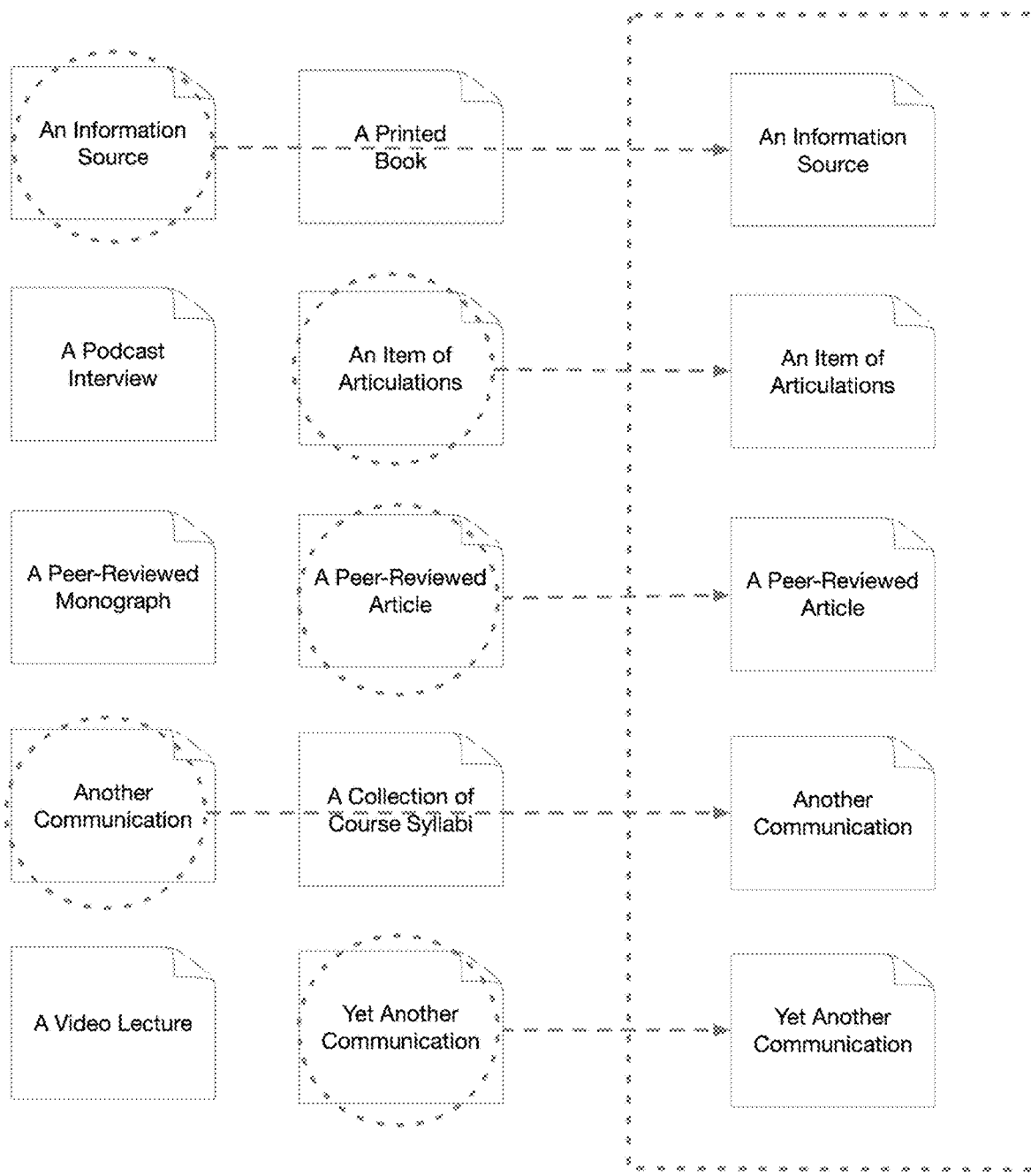
Figure 5D:
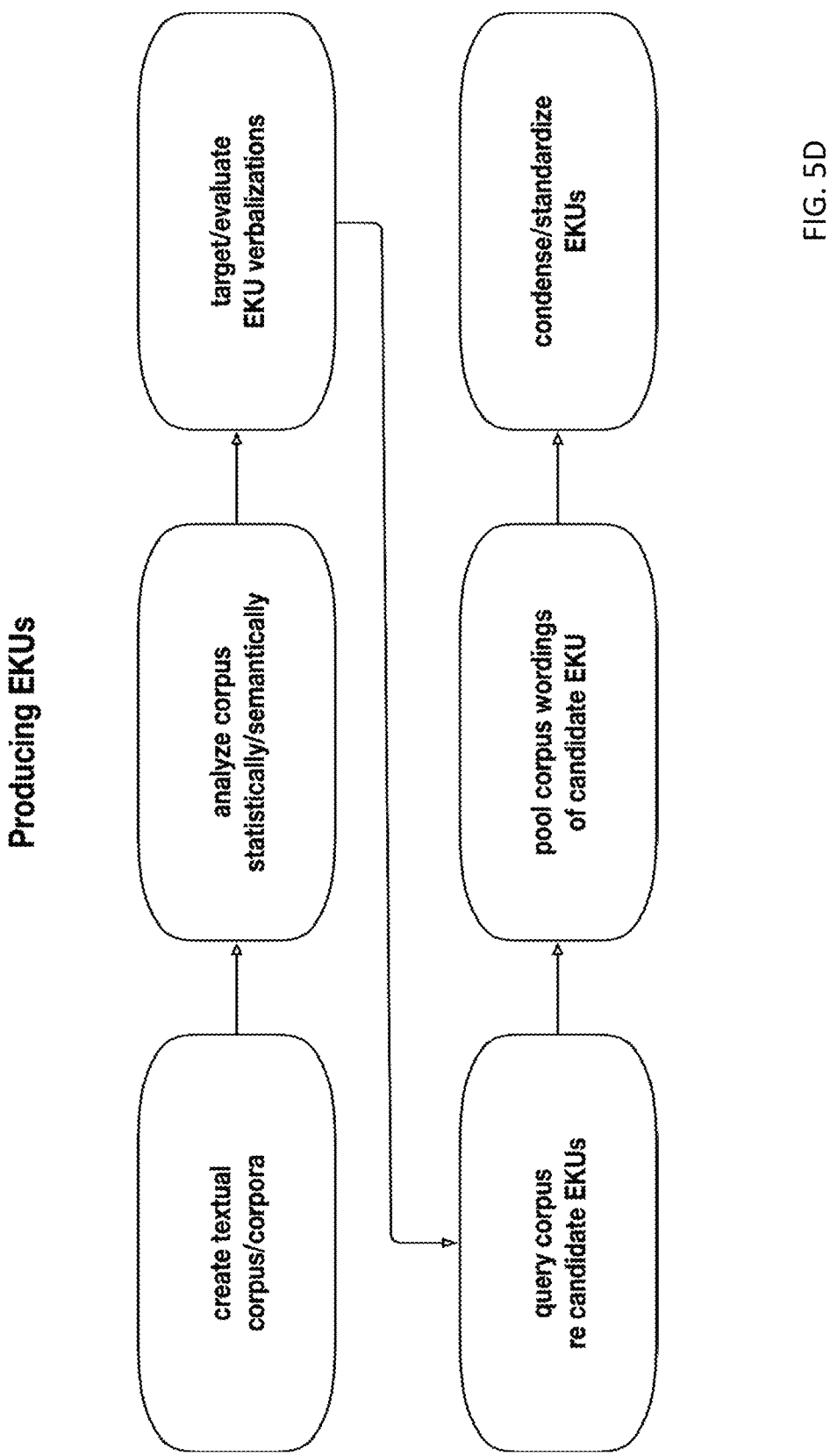
Figure 5E:
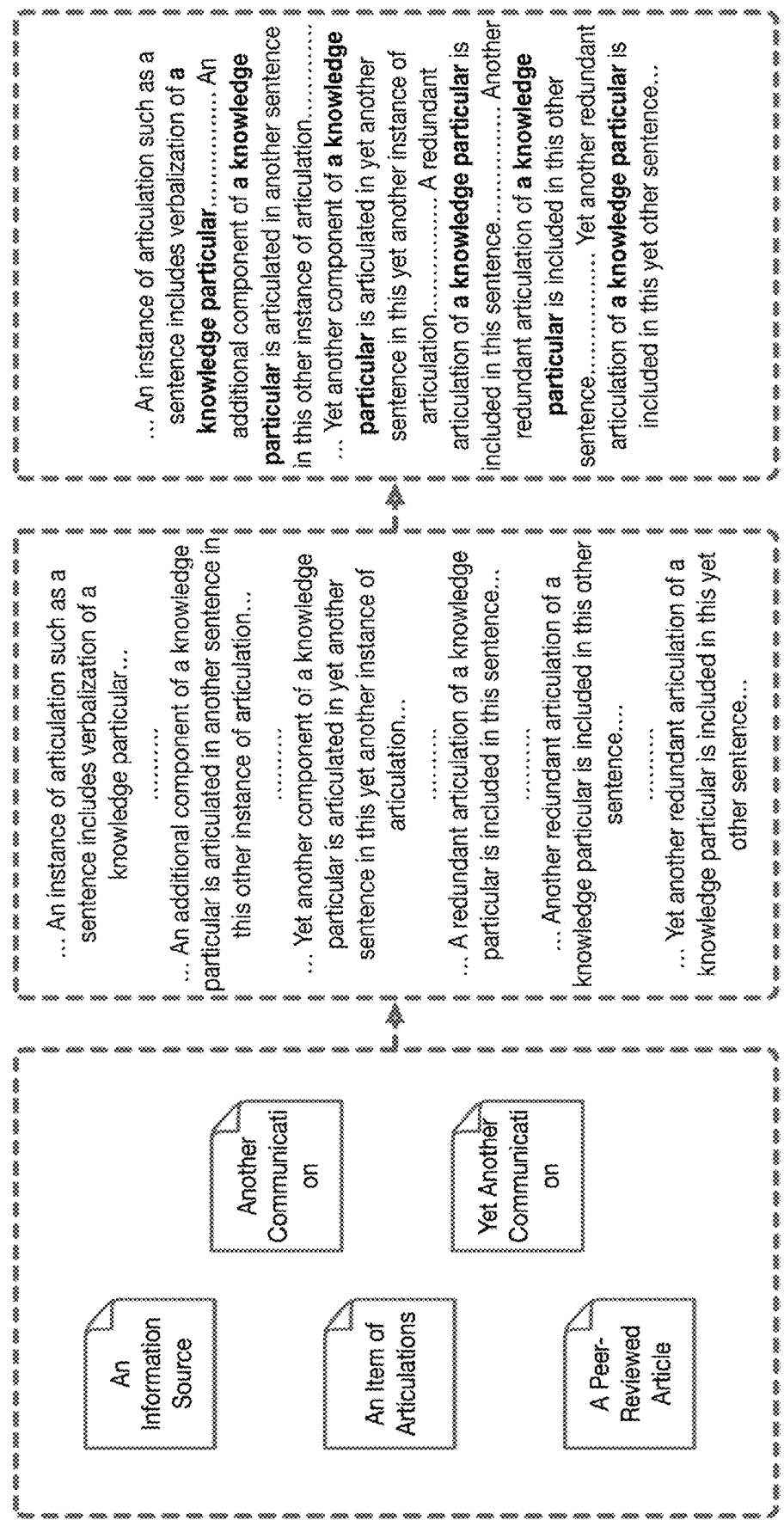

FIG. 4 provides a simplified illustration of a sub-BOK of the BOK illustrated in the FIG. 3, in which discrete IOAs are identified from the broader BOK based on some knowledge constraint, which may be expressed through EKUs, some characteristic associated with IOAs and/or EKUs, etc., e.g., presence or absence of an EKU, presence or absence of a keyword within the pithy articulation of an EKU, certain bibliographic information associated with an IOA, etc.

Notably, the invention's BOK designation is by no means limited to the knowledge sections/divisions of the prior art. Within the scope of the invention, the BOK designation may include any number EKUs, such as 1,776 web document matches that a search engine returned for the keyword pair "folk music" when accessed from a New York location on Jan. 1, 2019.

In addition, the invention allows also for designating BOKs that are not finite, without loss of clarity as to their BOK designation (such as for example when IOAs to which the BOK is limited may be continuous, ongoing, etc.). As a BOK may also be advancing (i.e., as knowledge identifiable as belonging to a BOK may change and/or new knowledge may emerge that may be identifiable as belonging to a BOK), one or more new/additional IOAs embodying such new knowledge may also augment the BOK's scope of physical embodiment (including on a continuous basis). Similarly, a BOK may also be improved, refined, redefined, etc. by excluding specific EKUs and/or by excluding the knowledge embodiments of specific IOAs.

Within the invention's scope, it is also possible to conceptualize a single IOA as embodying an entire BOK (e.g., Marvin Minsky's book "The Society of Mind" may be conceptualized as the physical embodiment of the BOK "Marvin Minsky's 'The Society of Mind'"); the invention also further operationalizes this possibility (e.g., in abstracting, constellating, re-constellating, etc.).

Also within the invention's scope; whereas the EKUs that constitute a BOK are, in the plurality of their BOK identity, identifiable apart from the plurality of the EKUs that constitute a different BOK; any selfsame EKU may be identifiable (designated) as part of more than one BOK; for example, a semantic statement regarding an aspect of research methodology may simultaneously be part of BOKs identifiable through designators that may include keywords such as "anthropology," "sociology," etc. And just as a selfsame EKU may be embodied in more than one IOA, any given IOA may also be identifiable (designated) as one embodiment of more than one BOKs at the same time; for example, a report on an experiment in genetic editing may simultaneously be classified/designated (and for the purposes of the invention operationalized) as an embodiment of BOKs identifiable through designators that may include keywords such as "biology," "chemistry," "engineering," "nanotechnology," etc.

Systematizing Existing Knowledge

In various embodiments, the system 10 systematizes existing knowledge via one or more (machine and/or human) agents, including agent(s) making use of additional computerized processing and/or other aids/tools. The aids/tools that any such agent may employ within the scope of the invention include processor-powered devices and/or processes and/or outputs, including such that are commonly referred by artisans through metaphors of "intelligence," "learning," "neurons," etc. (e.g., "artificial intelligence," "machine learning," "deep learning," etc.).

A "systematized inventory of a body of knowledge" or "SIBOK" as used herein refers to a BOK that has been systematized according to the present invention. The invention's methodology for producing/systematizing a BOK takes place generally over five or six stages: 1) the definition/identification of a target BOK, 2) the sampling of IOAs embodying the target BOK, which may be identified also via keyword searches or prior knowledge of the agent that may be curating the process, 3) the production/generation of EKUs, 4) the inventorying of BOK dynamics, including EKU-to-EKU and EKU-to-BOK relationships, 5) the finalizing of the SIBOK, including EKU ID'ing/numbering, associating, annotating, etc. An additional stage may optionally be involved: 6) the updating of the SIBOK, including planning/queueing future and/or periodical/ongoing updating. Whereas this order of the stages is exemplary of the performance of the invention's methods in systematizing knowledge, the skilled artisan will appreciate that various durations for any of the stages, various alternative orders of the stages (including repetitive, recursive, etc.), as well as various hard/soft thresholds for transitions between them, are all within the scope of the invention.

In addition, the FIGS. 5A-5E also provide simplified illustrations for these exemplary stages of the performance of the invention's methods for systematizing knowledge.

A BOK may be generated by the system 10 through the processing of IOAs and the systemizing of the EKUs or the BOK may be set up or augmented by an agent of the system 10. As noted above, the system 10 via the agent may identify IOAs that the agent desires to feed to the system 10. The system 10 would then process the material and may update the SIBOK. For example, the system 10 may evaluate the impact of the new material on the existing SIBOK based on the EKUs identified and their interrelationships. If the new material does not substantively impact the SIBOK, meaning the EKUs and their interrelationship generally conform with the existing organization in the SIBOK, then the SIBOK may not be updated. As previously described, as the system 10 processes many IOA sources, it may be desirable to flag IOAs that would trigger an update of the SIBOK, so the EKUs and the interrelationships identified in the IOA may also be reviewed prior to the SIBOK update.

An agent, such as a system 10 administrator, curator, or user, may designate a BOK for processing, add a BOK to a processing order/queue, direct the system 10 to process a BOK, and/or direct the system 10 to designate a BOK and/or IOAs for sampling, isolation, accessing, processing. Furthermore, system 10 may be configured to consume any selection of (including all of) IOAs in any range of various publications on any periodical basis. For example, various private and/or public publishers may provide digital feeds for various (pre-)publications that may be accessed by the system 10.

A BOK may be constructed or updated by the system 10, administrator, or user selecting IOAs for consideration for inclusion in the BOK; these are then particularized so that EKUs may be generated. The agent(s) may select IOAs in accordance with any set of criteria as per the invention's definitions. For example, they may target to sample a BOK that they may define (ad hoc, to the best of their ability, provisionally, etc.) so as to resemble a field of knowledge that may enjoy recognition in current practice, but that the current art does not define unambiguously (e.g., "nuclear physics"). Any number of IOAs may be deemed/designated as relevant for this purpose within the scope of the invention. These may include; also within the selfsame sample, as desired; IOAs that may range in representational style from highly homogenous (such as research articles published in one specific scholarly journal, be it a peer-reviewed venue such as "Nature" or such as "Journal of Virology," or a non-peer reviewed venue such as "MIT Technology Review"); to highly heterogeneous (such as, keeping with the science illustration, formal or informal interviews with experts of a given field or audio recordings thereof, video recordings of lectures or symposia, podcasts, printouts of college course catalogs or syllabi, research poster or slide-shows, edited volumes, single-authored monographs, etc.). In addition, sampled IOAs may represent, including also within the selfsame sample, IOAs originating from within a timespan or from across different timespans of any length (e.g., review papers published in "American Sociological Review" between 1951 and 1955, inclusive; syllabi of introductory chemistry courses at the University of California at Irvine from the academic year 1994-95 less the summer session and at Yale University from the calendar year 1997).

EKU Generation

A BOK's EKUs typically assume various and multiple appearances (that, as discussed heretofore, may be overlapping, incomplete, contradictory, etc.) through various and multiple language embodiments occurring throughout various and multiple of the IOAs that may have been targeted/sampled as representative embodiments of the BOK. Given that the sampled IOAs generally also represent varieties and differences in formats (as well as storage modes, protocols, and devices), producing EKUs generally streamlines these differences by extracting and/or converting and/or inserting the textual contents of the sampled IOAs into a streamlined body of text, such as today's artisans refer to as a "textual corpus" or "textual body." Various data or document storage formats, protocols, and/or devices may be used for maintaining, managing, storing and/or interacting with the textual corpus. In addition, multiple such streamlined bodies of text may be produced; i.e., the particularization of a given BOK through a given sampling of IOAs may also start with producing multiple textual corpora.

This stage may involve creating one/more new documents/databases out of one/more IOAs, generally so as to convey, record, and store, the knowledge embodiments contained in the IOAs into one/more text formats/storages that allow for further processing as per the invention's methods. (For example, a document that comes originally formatted for the web may first be converted into a plain text document; language articulations originally stored as an audio/video file may first be transcribed and stored in the form of database entries; several such text documents and/or database entries may be combined into one or more larger documents/databases; etc.) The agent(s), system 10, and methods may then use such corpus/corpora for identifying and analyzing the various articulations/verbalizations of the BOK's EKUs. Optionally, as directed by agent(s) and/or system 10, this process may be repeated; one/more of such repetitions may also involve re-sampling of IOAs, and/or creation of alternative/additional textual corpus/corpora and/or (sub)corpus/(sub)corpora; generally until agent(s) and or system 10 are satisfied with such artifacts, for example until the system 10 determine that a particular (sub)corpus of IOAs constitutes a satisfying representation of the target BOK.

As the skilled artisan will appreciate, various supplementary and/or technical data/information regarding the sampled IOAs themselves may also be retained/stored or not retained/stored together with and/or so as to be associable to the one/more documents, databases, and/or storage that retain the corpus/corpora. Similarly, within the scope of the invention, the system 10 may cause various transformations to the corpus/corpora, including on a periodical/recurring/ongoing basis, for example such as they may deem to be useful for the (further) processing thereof.

In converting the various IOAs into text, in setting up the textual corpus/corpora, as well as in further processing such corpus/corpora (and/or sections thereof) as explained and taught herein, the invention generally employs computerized natural language processing ("NLP") techniques that are inherently statistical in nature, including when such techniques may be employed so as to allow for computerized semantic processing of text (e.g., when they enable drawing semantic answers from a textual corpus). The invention generally uses numerous such NLP techniques at various stages, for example to transform, to describe statistically, to analyze, as well as to query the various textual (sub)corpus/(sub)corpora that it may set up at various stages. In addition, blended statistical-and-semantic techniques may be employed by the system 10, including also recursively, on a corpus/sub-corpus (and/or corpora/sub-corpora), for example to standardize/fine-tune the pithy articulations of EKUs being produced, to determine/finalize the representations of their relationships/standings, etc. As will be appreciated by the skilled artisan, interspersing and/or combining various such NLP techniques at various stages, as well as making additional/alternative adjustments to them, for example as desired by the artisan and/or by the system 10, also lie within the scope of the invention.

Aiming to produce an exhaustive (or non-exhaustive) inventory of the EKUs that the target BOK comprises, the system 10 may then read and/or juxtapose and/or annotate (possibly also re-read, etc.) the textual corpus/corpora so as to familiarize themselves with the statistical as well as with the semantic contents thereof. To identify and evaluate various verbalizations of knowledge particulars, just as such may originate from across various sections of such textual corpus/corpora, the system 10 may further analyze the corpus/corpora statistically and/or semantically; they may also designate various significance and/or occurrence/frequency thresholds for textual segments at various lengths, wherein such thresholds and/or lengths may be designated as desired (including as per the outcome of statistical/semantic processing, on ad hoc basis, provisionally, etc.).

The system 10 may then proceed to standardize semantically those textual segments (including of any length) that may, in the process, be identified/designated as significant in the corpus/corpora (e.g., occurring at various relative frequency, involving a given string of words, etc.), as well as, optionally, re-determine significance thresholds (and so on). They may further perform one/more statistical/semantic queries onto the corpus, generally so as to produce and evaluate any plurality of answers originating from any plurality of locations within the corpus regarding such textual segments (of any length) that were identified/designated as significant or as of interest. Such queries may, in addition, use alternative wordings as desired (e.g., for a string of any number of words that may be identified as of interest in the standardizing of an EKU, a (sub)corpus and/or additional (sub)corpora may also be queried by using alternative words in addition to and/or in lieu of any of the string's original words, such as synonyms or antonyms thereof, other semantically-related words, etc.).

The system 10 may then proceed to pool any number of textual strings of any length into pools designated as semantically-equivalent (as per various thresholds) and/or as constituting the multiple/varied/etc. articulations of the EKUs within the sampled BOK. Such pools may also include one/more of the answers that the system 10 have gathered through querying the corpus/corpora, and which may have been identified/designated as semantically-equivalent (as per various thresholds); optionally, the answers may be pooled separately and/or so as to be associable with the pools of the corpus-occurring semantically-equivalent strings.

The final stage in the production of an EKU generally consists of the condensation of such pluralities of semantically-equivalent verbalizations, that were identified/designated and pooled as outlined above, into the singular pithy articulation of the EKUs. The system 10 may achieve such condensation by any statistical and/or semantic method or combination thereof; optionally, thus produced EKUs may also undergo (and/or be queued for) further review/processing (for example by an editor, curator, etc.), generally as a skilled artisan may desire. With the EKUs produced, the system 10 may then catalog the BOK's EKUs thus produced such as for example by issuing a unique identifier to each (pithy EKU articulation), and they may further output an inventory thereof.

Figure 6:
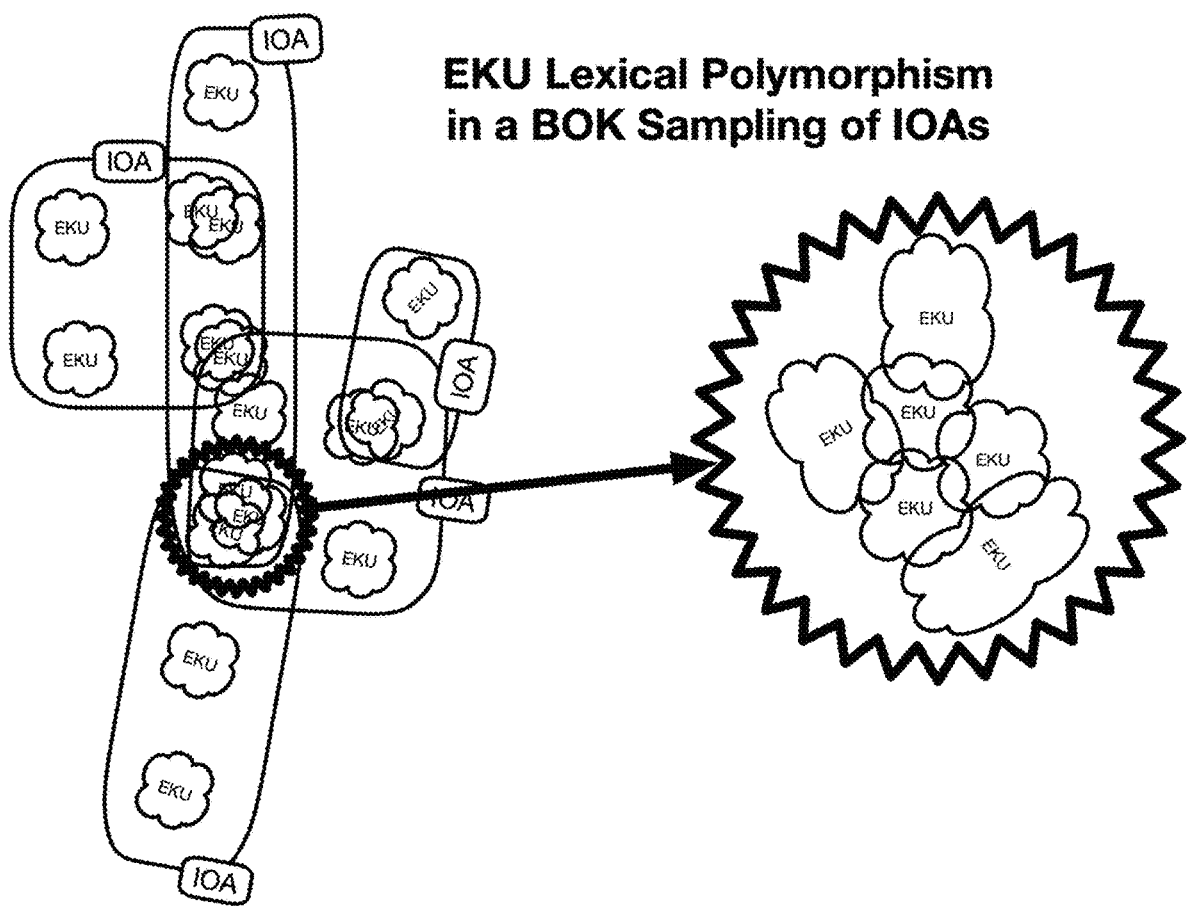

In addition, FIG. 6 provides a simplified illustration for the invention's modelling of EKU lexical polymorphism that the invention operationalizes in producing EKUs, as discussed heretofore. For example, FIG. 6 shows in the saw-toothed circle a plurality of similar semantic representations that may be uniformed into one EKU.

Figure 7:
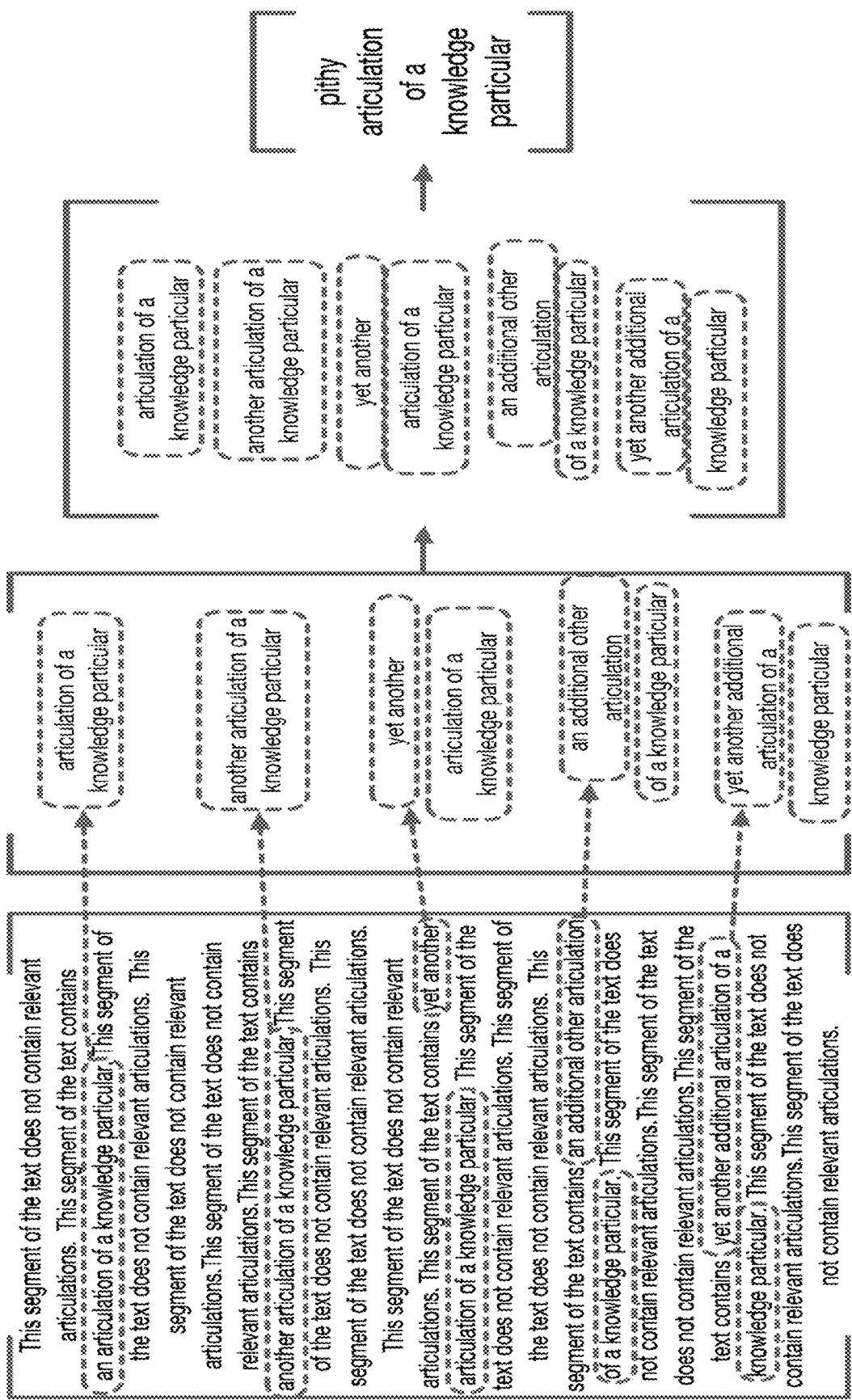

In further addition, FIGS. 5A-5E provide simplified illustrations for various of these exemplary aspects and methods of the invention in which the particularization of a BOK proceeds through stages of setting boundaries for a BOK that may be isolated from amongst myriad IOAs, then assembling such sampled IOAs, then processing them as textual corpora, then analyzing and querying them, etc., so as eventually to output one/more EKUs that the textual corpora may be found to contain, in condensed/standardized verbalizations, together with selective/exhaustive annotations and/or cross-referencing possibly for each such individual EKU, into one/more SIBOKs. In addition, FIG. 7 illustrates an exemplary aspect of the invention in which a condensed articulation of a knowledge particular is drawn out of more than one alternative articulations thereof; the semantic proposition is retained while the numerous alternative wordings are reduced to one pithy wording.

EKU Constellation

The ways in which the EKUs thus produced may be associated or associable to each-other are also important in reflecting a BOK's internal dynamics. Therefore, a SIBOK generally includes not only the pithy articulations of the EKUs but also their "constellations," i.e., descriptions of the relationships of EKUs to each-other, as well as descriptions of their respective standings within the SIBOK, generally in the form of various annotations that the system 10 may store and may further operationalize. The standing of an EKU within a BOK may be a measure of the frequency of occurrence of the EKU within and across IOAs that have been granulated into the BOK. Within the scope of the invention, to "constellate" the EKUs in a SIBOK-in-progress thus refers to identifying, determining, depicting, recording, and/or storing the EKU relationships and standings. The invention may constellate by way of charting a BOK with the purpose of determining each EKU's standing within the BOK, as well as each EKU's relationships to other EKUs in the SIBOK.

As described below, constellating allows for conveying to the users of the invention objective insight as to the relationship of the EKUs. Constellation may also provide insight into the relative standings of an EKU in within a BOK, between EKUs, and the levels of engagement of the EKU by any given cohort over time.

Figure 8:
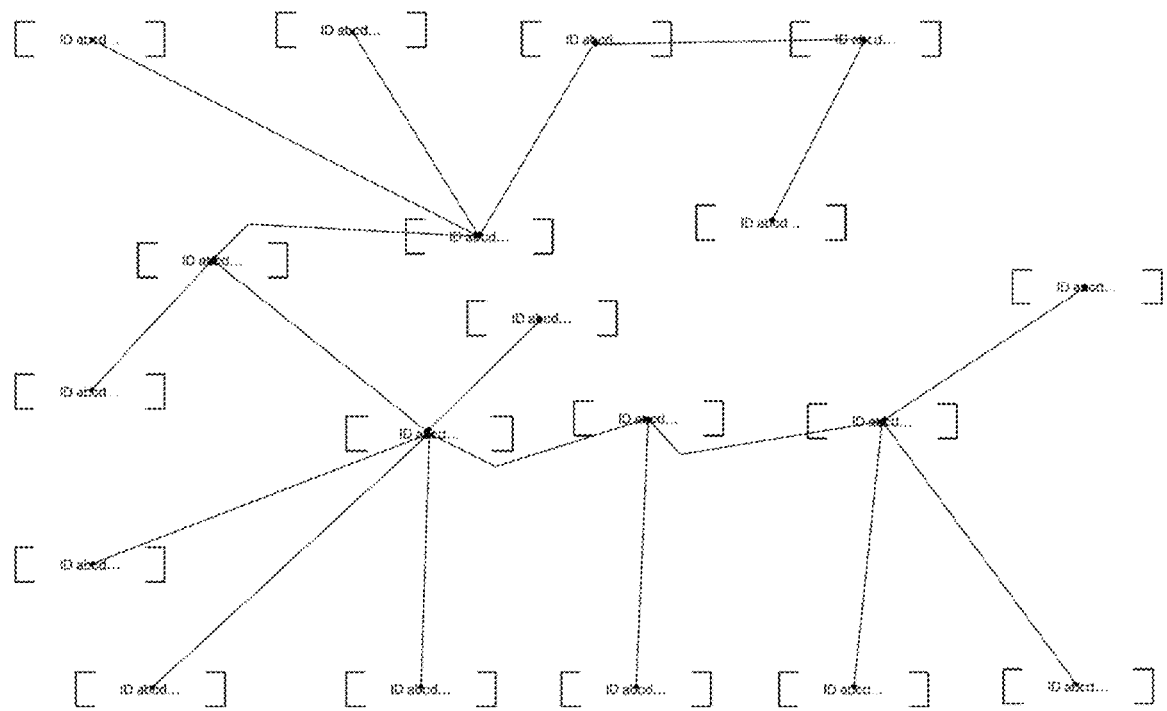

FIG. 8 illustrates an exemplary aspect of the invention in which EKUs are constellated so as to convey knowledge for example to a learner through the invention's method of one-particular-at-a-time learning over the course of conversational style exchanges in natural language, as explained and taught herein.

Any given EKU of any given BOK can generally be constellated as per statistical measurements (e.g., frequency of occurrence within any given (sub)corpus and/or (sub) corpora corresponding to any given samplings of the BOK), and/or semantically (e.g., by identifying/determining descent, co-descent, similarity, dissimilarity, support, contradiction, etc., that characterize how the EKU relates to any other EKU in a (sub)corpus/(sub)corpora representing any given sampling of IOAs for that given BOK).

To constellate the EKUs, the system 10 may, generally upon the completion of particularization (i.e., when EKUs have been produced as per a given sampling of a given BOK), statistically cross-survey the corpus/corpora at hand and/or the SIBOK-in-progress (in entirety or in part) so as to identify frequency concentrations for any given EKU (including all EKUs), including in various of their multiple/ partial verbalizations (of any length, as per identified/determined thresholds). Such statistical cross-surveying may determine, with the greatest objectivity that a given implementation of the invention may be able to achieve in practice, any given EKU's standing in the BOK (e.g., "BOK X Centrality Score, as per Sampling Y: 99%" or "BOK X, Sampling Y, Tier Ranking: 2").

Figure 9:
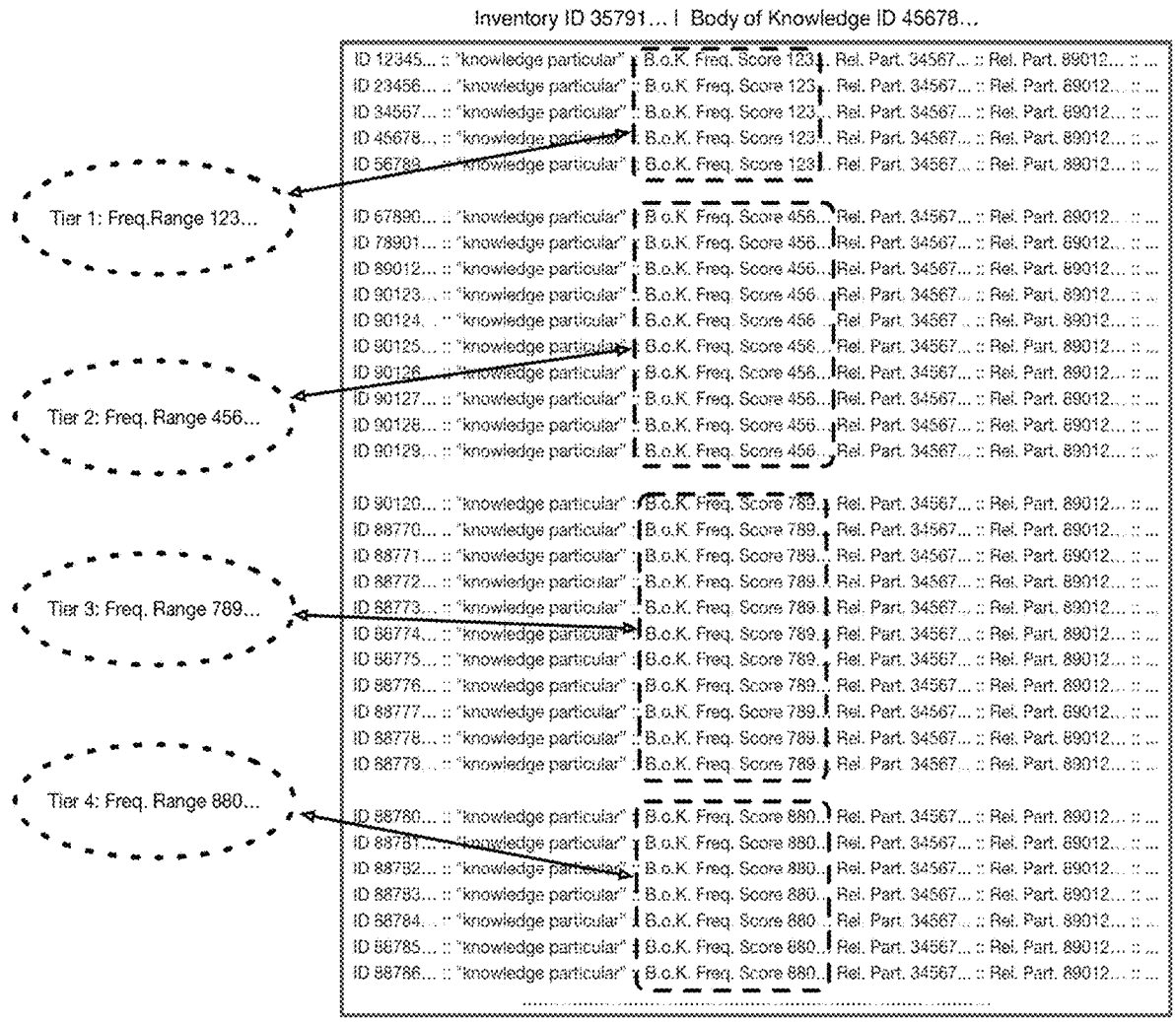

FIG. 9 illustrates an exemplary aspect of the invention in which a SIBOK is constellated as per one of statistical methods which may include, as illustrated here, a ranking or standing of EKUs in tiers or degrees, such as may be determined, for example, by the frequency score ranges of each EKU's "organic" occurrence within a sampled textual corpus of articulations corresponding to a given BOK.

Similarly, and in addition, the system 10 may also cross-query semantically both/either the corpus/corpora and/or the SIBOK-in-progress (in entirety or in part) so as to identify, for any given EKU (including all EKUs), its semantic relationships to any other EKU (including all EKUs). Such statistical cross-surveying may determine, with the greatest objectivity that a given implementation of the invention may be able to achieve in practice, any given EKU's relationships to other EKUs (e.g., "Relation to EKU #678: No Dependency," "Relation to EKU #789: 3rd degree," "Relation to EKU #890: Descent from EKU #901, Exclusive," etc.).

Figure 10:
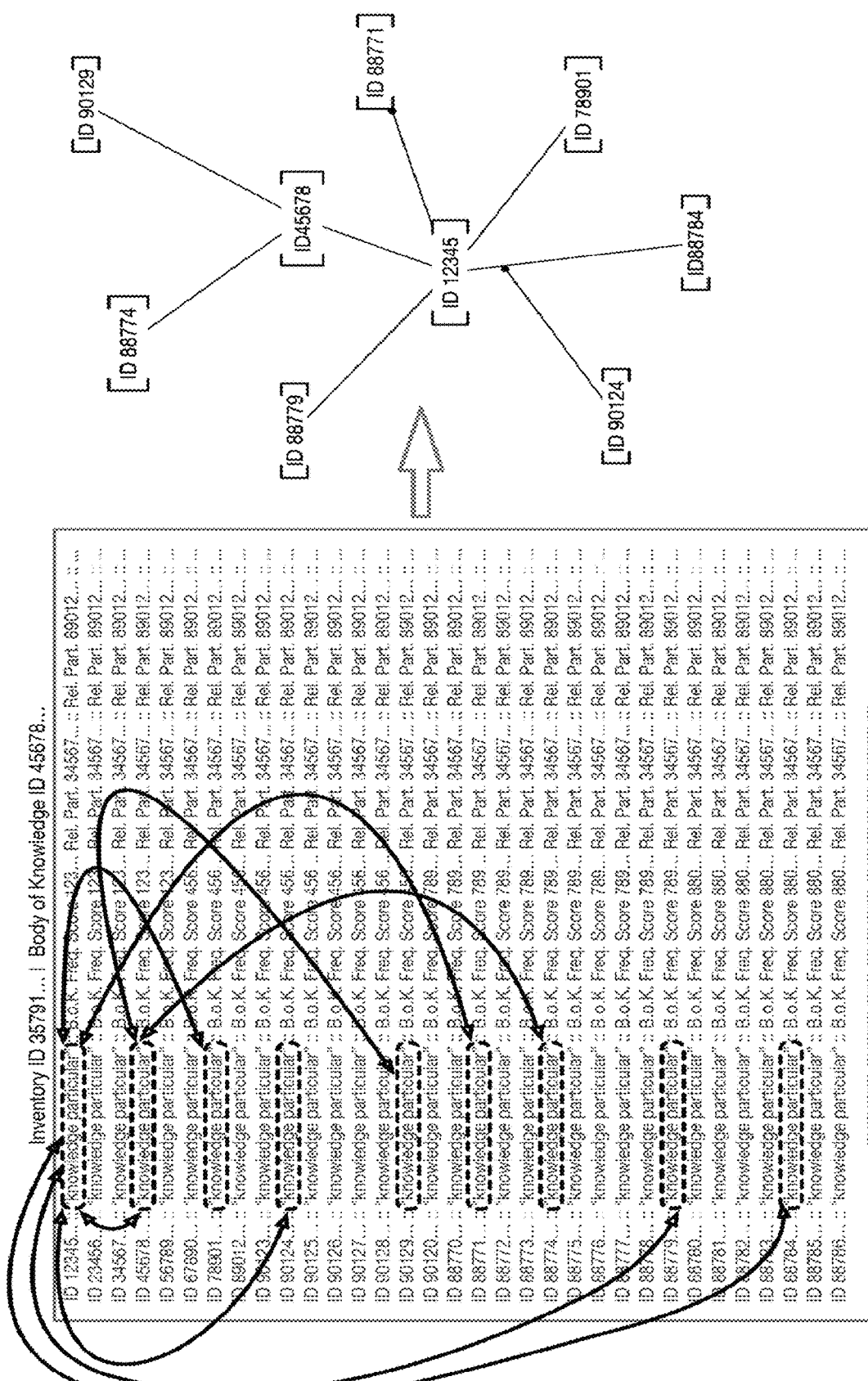

FIG. 10 illustrates an exemplary aspect of the invention in which a SIBOK in a given knowledge repository is constellated as per one of semantic methods which, as illustrated here, include the identification and/or isolation of at least one semantic relation between one EKU and another EKU, as determined by their "organic" articulations within a given corpus (or section thereof) corresponding to a given BOK, and/or as so designated (for example by system 10 administration).

The system 10 may further associate or cross-reference any EKU's entry (including all EKUs' entries) in the SIBOK-in-progress with the respective constellation information, and/or further annotate any such EKU entry in the SIBOK through one/more additional references, including references external to the samplings of the BOK, and consisting of information in non-standardized format, and/or standardized format, and/or semi-standardized format, etc.

For example, an EKU inventoried in a given SIBOK may include a reference to the frequency at which it occurs within a BOK as sampled through IOAs; as well as, in addition, possibly also an association to an individual researcher or author who may have engaged the proposition whether in affirmation or in contradiction; as well as, in addition, possibly also a cross-reference to a journal that may have published articles discussing it and/or the associated researcher/author; etc.

Furthermore, through constellation, the invention also provides for enhanced reliability in the systematization of a BOK into a SIBOK. The usefulness for this aspect of the invention may arise, for example, if and when the pool of IOAs sampled as embodiments for a given BOK includes IOAs that do not legitimately or actually constitute embodiments for the target BOK (even despite correct sampling procedures). To illustrate, an IOA may be sampled because of a reasonable connection to another IOA that was part of a prior sampling, such as for having received a citation in the textual body of that prior-sampled IOA. But although it may be common for an IOA to constitute an embodiment of a BOK when that IOA is cited by another IOA that does in actuality constitute an embodiment for that given BOK, such may not always be the case: e.g., a research paper from an environmental scientist may include among its citations a paper from a distinct field such as economics or psychology, etc.

In further addition and example, sampled IOAs may contain EKUs that may not reasonably or legitimately be considered part of the BOK for the particularization of which they were isolated/sampled (even though such EKUs may be particularized/produced correctly). For example, among the textual material that becomes part of a particularization corpus for a BOK such as "Legal Studies, year 2009" may lie several lengthy textual fragments from peer-reviewed articles from various biology journals pre-dated by approximately a decade; the inclusion of these texts in a particularization corpus for the BOK "Legal Studies, year 2009" may be legitimate, however, for they may in fact be part of the larger textual body of a book by an animal rights academic that may have been correctly sampled as an IOA embodiment for the BOK "Legal Studies, year 2009."

Generally, through various constellation aspects and methods, the invention provides for spotting such EKUs that may not legitimately be part of a given SIBOK despite otherwise correct particularization. The invention thus provides for enhancing the reliability of a SIBOK, for example through alerting and prompting system 10 to review the EKUs that were thus spotted as not likely belonging in a given BOK/SIBOK, and/or to expunge them from the SIBOK (-in-progress) as desired/determined.

To illustrate by extending the latter example, even if/when the EKUs from the lengthy fragments of text from biology journals were to be identifiable/producible through the invention's particularization methods, and so they were to be output (at one point and/or provisionally) amongst the EKUs of the SIBOK-in-progress for the target BOK "Legal Studies, year 2009," constellation will eventually reveal the marginal positions of those EKUs in the SIBOK-in-progress (as they will not likely be associable to many other EKUs in the BOK/SIBOK-in-progress), thus prompting for system 10 to further review the EKUs and/or to exclude them from the SIBOK.

In addition, the system 10 may also create an identifier for the SIBOK itself, in a similar way, associate the SIBOK's identifier with additional or referential information that may be non-standardized, standardized, or semi-standardized in nature. The system 10 may further repeat any combination of the previous steps to further augment the SIBOK, or any individual EKU, with supplementary information.

Re-Constellation & Updating Bodies of Knowledge

Additional aspects of the invention may be directed towards re-constellating knowledge particulars, i.e., generating constellations of EKUs that represent alternatives to the way(s) in which the EKUs may be "organically" related within the BOKs where they occur and/or are sampled. By contrast to the invention's particularization and constellation of a BOK, which generally starts with sampling IOAs; re-constellation thus generally starts with one or more SIBOKs, and may give rise to a new BOK (as well as a new corresponding SIBOK).

A need or desire for re-constellation may arise under a variety of circumstances, such as, for example, when a scholar is interested in understanding in comprehensive depth a particular phenomenon or issue that may be the object of research by scientists of more than one disciplinary field (e.g., a student may be interested in the imagery of the American Civil War, a topic which may not be restricted to only academic art historians, but also involve political scientists, and possibly others). In another illustrative setting, a need/desire for re-constellation may also arise when a leisure learner is interested in any number of distinct perspectives on a given topic (e.g., a prospective tourist who may wish to know about a prospective destination that has been the focus of travel writing in for example American, British, and Australian venues).

Whereas the invention may serve such needs also through its methods of designating BOKs specifically as per the relevant criteria and eventually arriving at corresponding SIBOKs, various embodiments of the invention provide re-constellating. Starting with one or more relevant SIBOKs, the system 10 outputs a re-constellation of EKUs in which one or more EKUs become the focal center of a re-constellation that may include their respective (annotated) entries imported from one or more SIBOKs as well as any number of additional EKUs selected as per certain associability/relationship to the initial knowledge particular(s), and originating from one/more SIBOKs.

Furthering the illustration of the leisure learner, first, an EKU in a given SIBOK (e.g., "EKU 12345" in, e.g., "Australian travel writing from the year 2001") may be determined as relevant to the leisure learner's interest because of involving a touristic destination in focus, just as may be an additional EKU in an additional SIBOK (e.g., "EKU 67890" in, e.g., "British travel writing, 2010-2015"). Second, the two EKUs may be output together as a re-constellation. Third, if desired, the two thus re-constellated EKUs may be turned into the seeding nodes of a fresh re-constellation (i.e., a new SIBOK) that may be further grown/augmented such as through further employing aspects of the invention (e.g., by adding any number of EKUs that may be related, statistically and/or in specific semantic ways, to one or more of the seeding EKUs; and/or drawn from writings associated with the writers associated with the starter-node EKUs).

Furthering the illustration of the student interested in re-constellating EKUs on the imagery of the American Civil War from BOKs related to art history, political science, etc., the system 10 may identify such EKUs in any number of relevant SIBOKs, and use them as seed EKUs for a fresh SIBOK, in which, in addition to the EKUs, also EKUs are included that, though not necessarily related to the interest/topic of the American Civil War imagery, may be related to the new SIBOK's seed EKUs for example by way of descent or co-descent in the respective original BOKs, by way of frequency of occurrence therein, etc.

In addition, various simplified illustrations for various of the invention's methods outlined here with regard to constellation are included in this specification as FIGS. 8-10.

Updating and Comparing Knowledge

As previously described, it may be desirable to update a SIBOK as new IOAs are processed by the system 10 that may alter the SIBOK. For example, if a SIBOK regarding the 2018 Winter Olympic Games was particularized into EKUs and constellated out of a sample that isolated relevant IOAs on the 10 Feb. 2018, while the games were ongoing, additional articulations on the games that became available on the 11 Feb. 2018 (e.g., reports published on media outlets that day) imply the possibility of containing knowledge that more accurately represents the state of the games. In such a scenario, updating the state of knowledge becomes desirable as a given day's SIBOK may, on a subsequent day, no longer represent reality (or the advanced/advancing knowledge thereof) accurately (e.g., various athletic scores or national teams' relative standings have changed, potentially more accurate representations thereof have been articulated, etc.).

Various embodiments of the invention provide solutions for such needs and desires through methods of updating knowledge in which the system 10 performs the methods disclosed herein on a BOK that is updated with new IOAs. Keeping with the above illustration, by updating the definition of the BOK to include IOAs from February 10 and of Feb. 11, 2018, the system 10 will regenerate the SIBOK based on the updated material.

In a similar manner, various embodiments may deliver comparisons of BOKs by comparing variation in SIBOKs over time. For example, recent advancements in a scientific research field (e.g., molecular biology) may be identified by (first) particularizing and constellating more than one BOKs (e.g., "State of Molecular Biology in the Year 2016" and "State of Molecular Biology in the Year 2017"), (second) juxtaposing the resultant SIBOKs, and (third) optionally also producing one/more inventories of the differences at the EKU/constellation level (e.g., a SIBOK consisting of only new EKUs (i.e., EKUs that appear only/first in the year 2017), a SIBOK consisting of only EKUs from the 2016 SIBOK that are found to be contradicted in the 2017 SIBOK, etc.).

The system 10 may be automated such that new IOAs are identified and processed so as to produce/generate EKUs that may be compared and/or contrasted to existing EKUs and SIBOKs so as to assess the relationship of the IOA to the SIBOK. In various embodiments, the inclusion of new IOAs into a BOK sampling may range from fully automated to requiring approval from a human administrator for each new IOA individually. In various embodiments, the system 10 will provide recommendation for the integration of an IOA into various BOK samplings that will be approved, rejected, or otherwise modified by the human administrator; the outcomes of such processes over time may be used for feedback such as regarding future IOA integration assessments.

Figure 11:
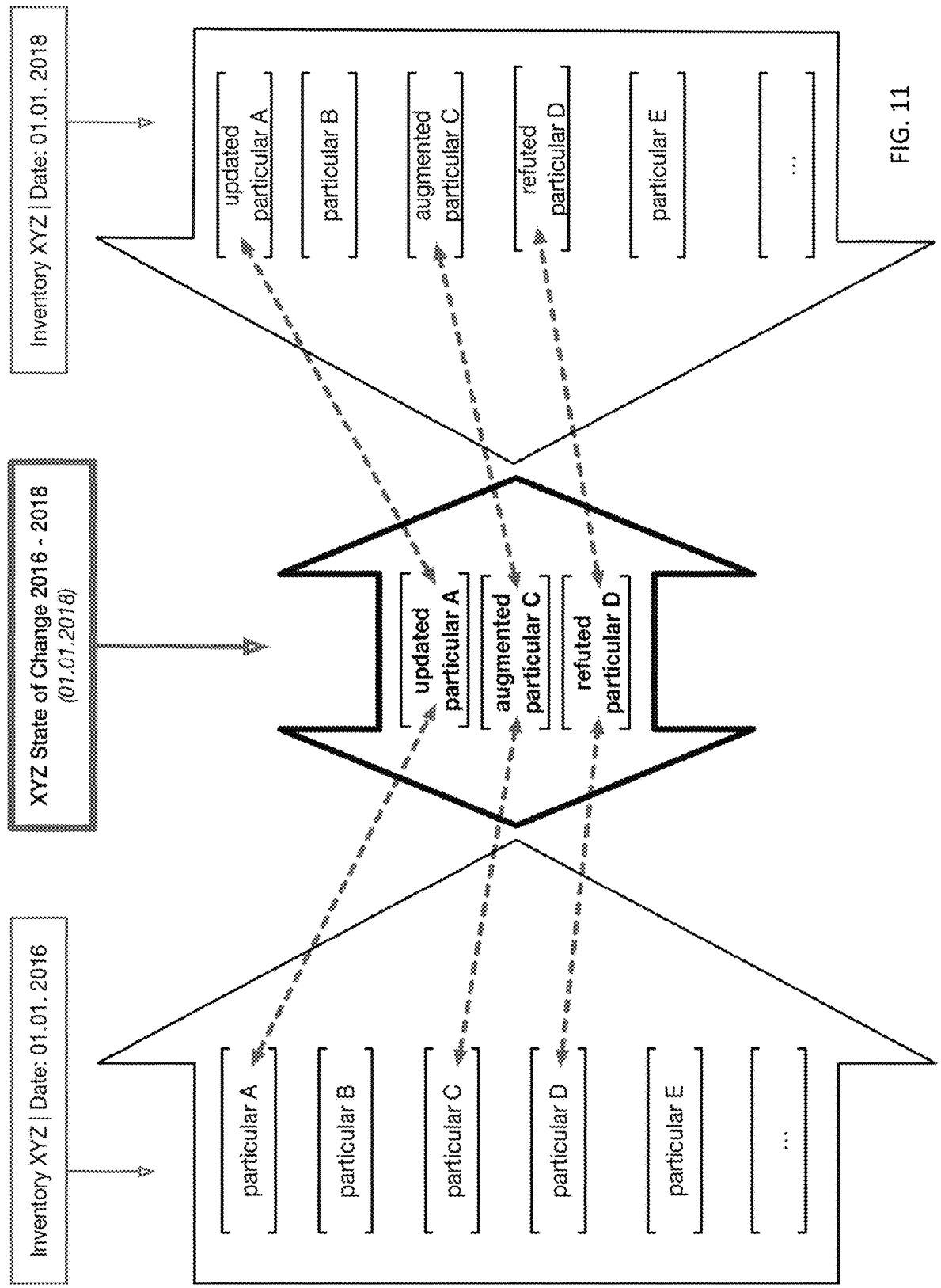
Figure 12:
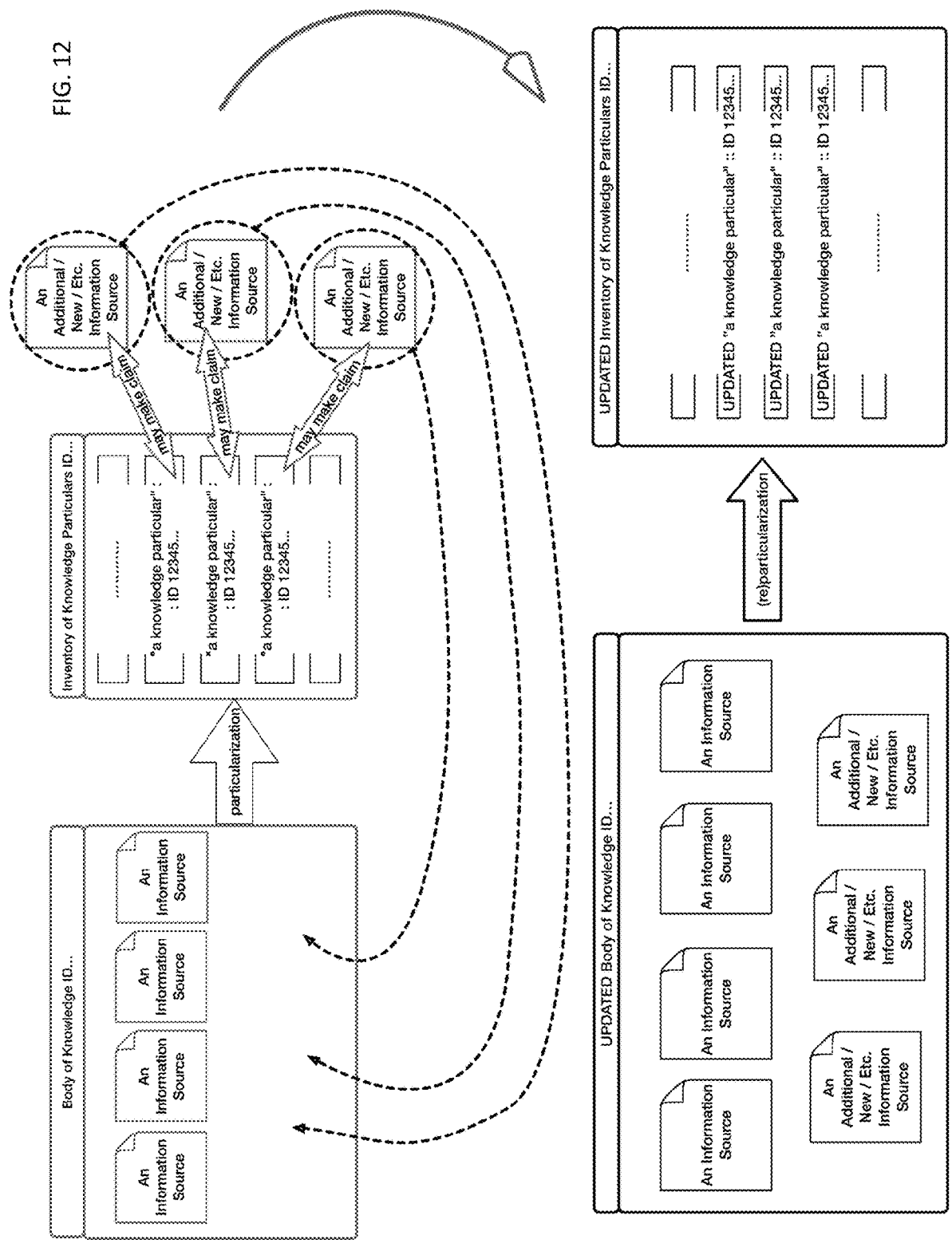

FIG. 11 and FIG. 12 are simplified illustrations of methods and processes for updating and comparing SIBOKs. FIG. 11 illustrates an exemplary juxtaposition of two SIBOKs, through which the invention may produce a SIBOK that contains and/or represents the differences between the two compared ones (for example, to reveal the transformation that a BOK may have undergone over a given period of time). FIG. 12 illustrates an exemplary updating of a SIBOK through the updating of the BOK (definition/sampling) that led to its EKUs such as through further including in the particularization sample of IOAs new and/or additional IOAs that may be found to be making (and/or designated as making) relevant claims with regard to given EKUs in the SIBOK.

Abstracting Using EKUs

Another benefit of EKUs is the ability to abstract IOAs. The meaning of an IOA may be observed in how the IOA relates to a given BOK. For each EKU in a SIBOK, the system 10 may assess whether the IOA (re)confirms, (re) negates, augments (and if so, how), or does not relate to the EKU.

For example, a paper published in the "Journal of Experimental Algorithmics" may be found likely to be relevant to the field of computer science, or the system 10 may decide to pursue constellating the knowledge that such a paper may contain to a SIBOK associated with the current state of knowledge in mathematics. The system 10 may review an exhaustive/selective number of EKUs in the SIBOK and, for each such EKU, the system 10 may formulate one or more questions to be addressed to the IOA being abstracted. The system 10 may then record whether the semantic contents of the IOA being abstracted are/is or are/is not related to the EKU. When related, the system may determine whether the IOA confirms or contradicts the EKU and in what way(s) it affirms/contradicts it etc. The system 10 may then compile the abstract of the knowledge contained in the IOA in the form of a cumulative record identifying the EKUs in the SIBOK to which the IOA was found to relate, as well as the records of such relations (i.e., the IOA's answers to the EKUs operationalized as questions).

The system 10 may be used to compare how an IOA compares to a SIBOK also so as to make decisions regarding updating the SIBOK. For example, if the EKUs in an IOA contradict one or more of the EKUs in the SIBOK and/or the interrelationship thereof, the system 10 may decide for or against triggering an update of the SIBOK. The decision to update a SIBOK may be determined also by other methods, such as by a curator, based on a time or number of new IOAs introduced, etc.

Figure 13:
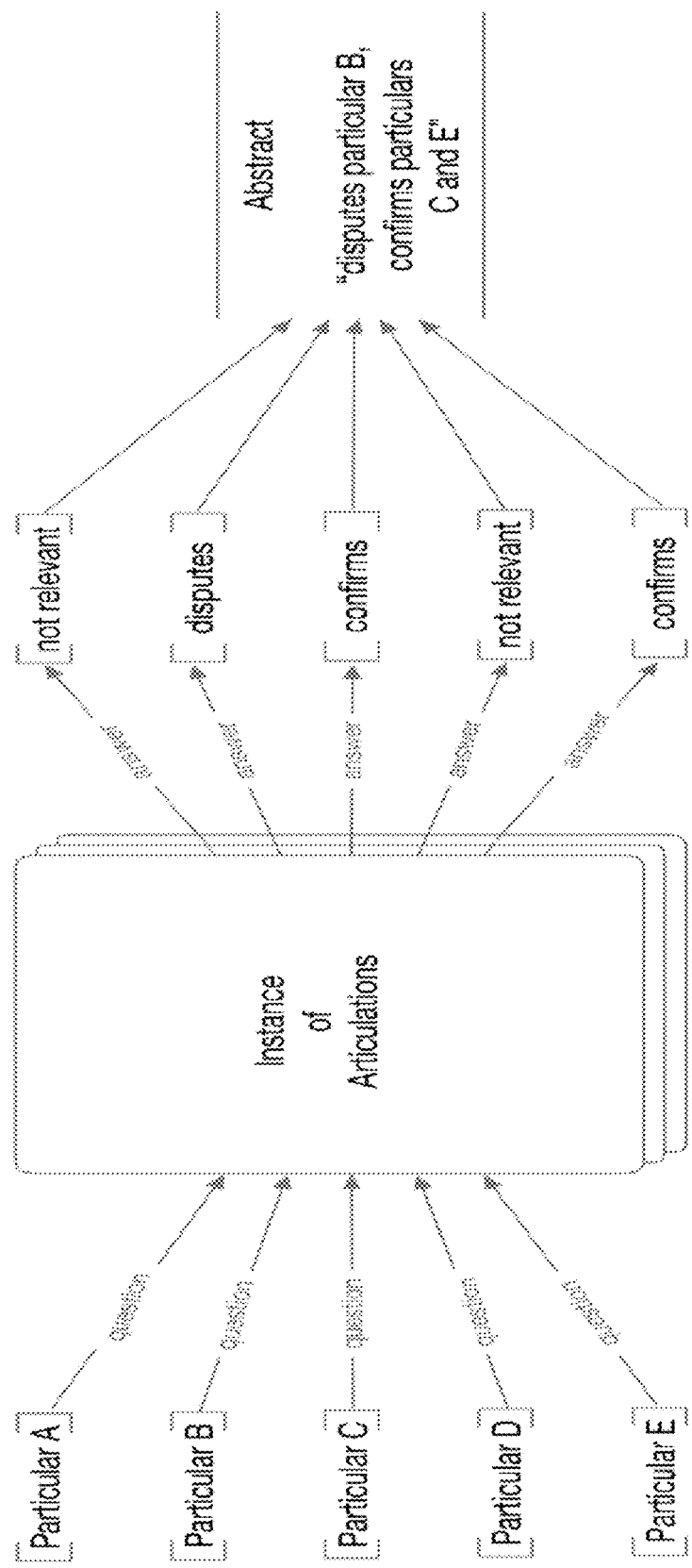

FIG. 13 provides a simplified illustration for various of the invention's methods in which an IOA is abstracted through querying it by a number of EKUs in a SIBOK. As illustrated, the system 10 may query the IOA, wherein each query may address a semantic relationship of the IOA to a specific EKU, such as whether the IOA affirms, refutes, augments, or is not related to the EKU. The system 10, via an agent or otherwise, may then output a compilation of the outcomes of such querying as an abstract of the IOA.

Learning Via EKUs

While foreseeing the distribution or commercialization of SIBOKs/EKUs through conventional ways/routes (e.g., search-access, databases, print), another aspect of the invention is directed towards conveying mastery of knowledge through one-at-a-time absorptions of EKUs. In various embodiments, the system 10 conveys EKUs to users/learners in their areas of interest. While the system 10 may usually be directed toward learning by a human, a learner in the context of the present invention may include other processors, devices and systems and other entities capable of learning.

The system 10 may, for example, orally read or recite a given EKU out of a given SIBOK to one or more learners, and possibly repeat such reading or recitation, or re-articulate the EKU's semantics in other words, so that the learner(s) become familiar and eventually memorize the semantic contents of the EKU (e.g., one or more tutors may perform such recitals before an individual student or before a group of students in person, or via a telephone or mobile or internet connection, or via other means/channels of communication). The process may be repeated for one/more additional EKUs/SIBOKs.

To aid the absorption of the EKUs of a certain standing in the BOK (i.e., a given constellation of EKUs in a SIBOK), the agent(s) may proceed so that the EKUs of that certain standing are conveyed to the learner(s) in a specific order. The invention also allows for the system 10, as well as for the learner(s), to determine the order in which EKUs are conveyed or not conveyed (e.g., when a learner already knows a given EKU).

Variations of this method of conveying knowledge may include means other than oral communication. For example, the pithy EKU articulations produced as per the methods described herein may be commercialized as print, be published digitally, be disseminated over a network, be shaped as study aids, be implemented for interactive communication (e.g., as a web application, on a mobile device, etc.).

Assessing Knowledge Mastery

In additional aspects, the invention provides for assessing mastery of knowledge through comparing articulations of EKUs/SIBOKs, preferably over the course of the learning exchange, as well as integrated in such learning exchange.

This contrasts the current state of the art for knowledge mastery assessment that, by necessity, separates assessment from learning. In additional contrast, recall of arbitrary (and often marginal) details is currently a common method of mastery assessment, based on the assumption that a student would only be able to recall an arbitrary/marginal detail from a given text if the student possessed thorough mastery of that text in its entirety; such mastery, in turn, proxies for mastery of the entirety of the field of knowledge which the instructor effectively appointed the text to proxy. For example, a student can pass many college courses solely by correctly matching a given ratio of (multiple-choice) answers to a number of (standardized) questions concerning (a selection of details in) concerning the subject matter.

In various embodiments of the invention, system 10 may compare one/more of a learner's verbalizations of an EKU to its corresponding SIBOK record in order to assess the learner's mastery of the EKU; proceeding one-EKU-at-a-time, the agent(s) may thus ultimately assess the learner's mastery of the entire the BOK. For example, if the two articulations of the EKU (the learner's and the SIBOK's) are semantically equivalent, (including when involving alternative verbalizations,) the agent(s) may assess the learner as having absorbed the EKU. If the learner's verbalization differs semantically from the EKU's SIBOK record, including if it differs despite similarity of wording, the learner may be assessed as having not absorbed the EKU. If the system 10 cannot make a satisfactory determination as to whether the learner's articulation is or is not semantically equivalent to the EKU's SIBOK record, the system 10 may prompt the learner for one/more additional re-articulations/re-wordings, and/or prompt the learner to make her or his own determination including by offering (including repeatedly) to the learner the EKU's SIBOK record for comparison.

These steps of comparing articulations may be repeated for other EKUs so that determinations about a learner's mastery of a given BOK can be made with a high degree of accuracy. For example, a learner's overall mastery of a given BOK may be assessed through cumulating the assessments of that learner's mastery of the corresponding SIBOK's EKUs: e.g., a learner knows 31 EKUs out of a SIBOK's total of 100, or a learner has mastered 200 EKUs out of 210 in a given SIBOK, etc. In addition, assessments may be performed, prompted, directed, etc., by the system 10 and/or by the learner(s) (such as in self-assessment) over the course of, and preferably integrated with/in, the learning process/exchanges.

In further addition, the system 10, and/or a learner, can assign scores of similarity to that learner's verbalizations of an EKU as compared to that EKU's SIBOK record, as well as also score that learner's ability to produce alternative verbalizations (e.g., "EKU 888: known; similarity of verbalization score: 88%" or "SIBOK 777: 7% known; similarity of verbalization score: 77%"). One or more reports representing such scores may also be produced, including with annotation regarding the scoring (e.g., whether it was performed by the system 10 or performed by the learner, identifying the period of time over which the assessment took place, etc.).

Discovering/Correcting Knowledge Gaps

Another additional aspect of the invention provides for discovering and correcting knowledge gaps also based on comparing EKU articulations. This method can be carried out by system 10 as well as optionally also by a learner (for example in self-discovery/self-correction), generally over the course of learning exchanges and integrated therein. In various embodiments of the invention, in order to discover an individual learner's gaps in knowledge (which may need to be corrected e.g., before the learner may be able to comprehend and/or to master a given EKU and/or BOK), the system 10 (first) may review and/or analyze a learner's verbalizations of one/more EKUs that the system 10 suspect to be straying from their corresponding SIBOK records. The system 10 then (second) may identify missing semantics/terms as well as additional relevant EKUs in the corresponding SIBOK (as well as also in related/cross-referenced SIBOKs, additional designated SIBOKs, and/or in additional pertinent annotations). To correct a learner's knowledge gaps, the system 10 may then (third) proceed with this invention's learning method of one-at-a-time EKU absorption, now involving the identified knowledge-gap EKUs/constellations/SIBOKs.

Figure 14:
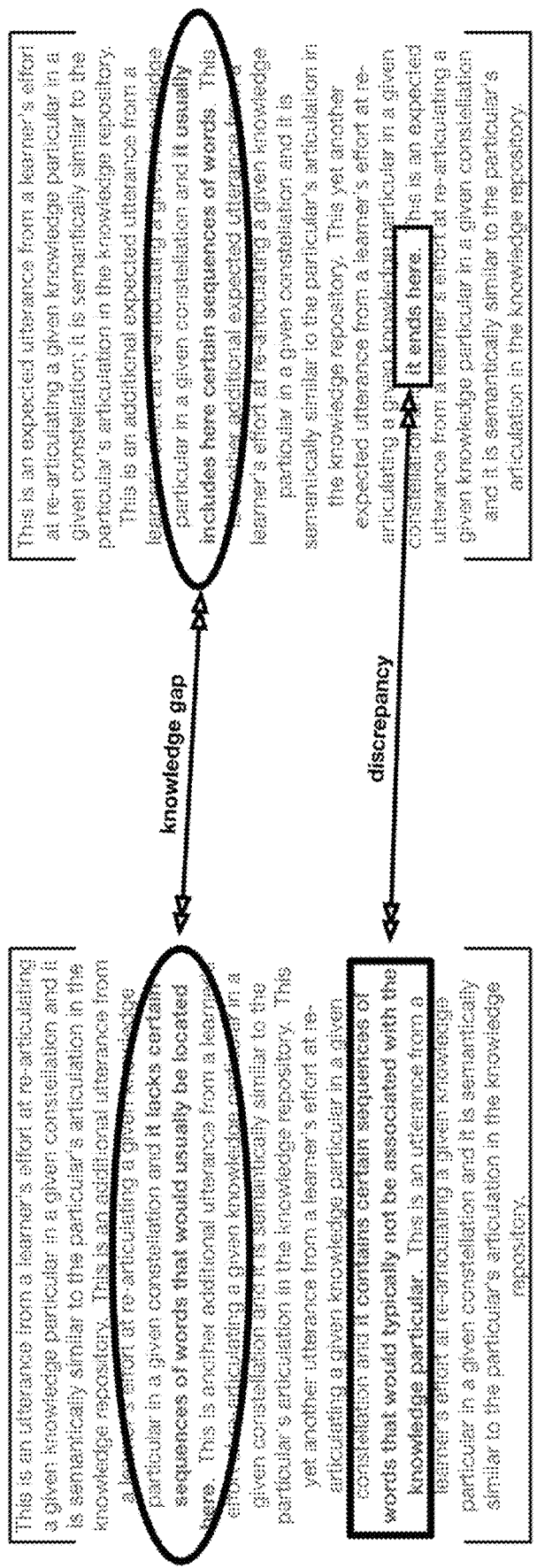

FIG. 14 provides a simplified illustration of an exemplary aspect of the invention in which mastery of knowledge is assessed and knowledge gaps are identified through the invention's method of comparing articulations from a learner against the corresponding/reference SIBOK articulations maintained by the system 10.

Searching/Finding Knowledge

The invention also further integrates SIBOKs with additional inventive aspects and embodiments, for example so as to aid an individual learner in gaining mastery of knowledge, etc., as explained and taught herein. In addition, one aspect of the invention is directed towards serving to users a SIBOK without significant further processing, for example through an implementation that may build on the user-engagement mode of the current art's search-and-find paradigm such as that is commonly implemented by libraries, for databases, and in web search. (Unlike in common art, however, the invention's embodiment helps users access knowledge rather than locate documents.) This aspect of the invention may thus serve a user with SIBOKs directly, and/or serve/distribute SIBOKs directly or indirectly and/or in integration/coordination with products/services of additional third-parties, and/or otherwise commercialize SIBOKs, e.g., via a web interface, a mobile channel, an internet-of-things device, etc., in text, speech, audio, etc.

In various embodiments, a user may originate a search for knowledge through the CDC 18, such as for example by inputting one or more keywords. Instead of returning one/more IOAs that contain the keyword(s) of the user's input or the web addresses thereof, in various rankings, such as current search engines do. The user may be provided with access to a SIBOK including EKUs, relationships, and other materials/annotations, in whole or in part, and in any order/manner, as desired or IOAs associated with keywords. For example, a user may input a pair of keywords such as "environmental law" into the CDC 18, and also instruct the system 10 to return "the three most prominent EKUs" from the SIBOK into which the system 10 may systematize the BOK "Environmental Law" and the year 2012. The system 10 may sample through IOAs consisting of only papers published in academic law journals in the year 2012. The user may then re-instruct the system 10 to run the same knowledge search with the differences of returning "the last EKU added to the BOK" as well as now sampling only IOAs from the year 2011, etc.

A Suite of Virtual Teachers

In various exemplary embodiments, the present invention may be animated as a suite of virtual teachers that implements methods of systematizing and managing knowledge and assists a learner with mastering knowledge, specifically provisional and expansive knowledge such as scientific knowledge, through conversational exchanges in natural language. Such systems may include a core of interconnected artificial intelligence frameworks that modulate scientific knowledge into elementary particulars, categorize the knowledge particulars across disciplinary formations, flexibly rank them across multiple orders of relevance, articulate them in natural language, and assess various natural language articulations thereof.

Knowledge Learning Interchange Cores (KLIC)

Returning to FIG. 1, The KLIC 12 generally performs five main functions: 1) taking in language articulations in the form of IOAs, 2) processing the IOAs to produce and constellate EKUs and SIBOKs, 3) storing the EKUs, SIBOKs, and associated information, 4) updating them, and 5) outputting them, such as by providing them to the rest of the system 10 (e.g., to the CTC 14). The KLIC 12 may be configured to take in, for example, language materializations of scientific knowledge in any of the broad range of formats in which they occur (e.g., digitized text, pictures, graphics, audio, including peer-reviewed articles, scholarly books, research poster presentations, course catalogs and syllabi, audio recordings of research meetings and lectures, as well as other formats). The KLIC 12 may process these IOAs so as to output pithy articulations of EKUs that subsequently may be catalogued within the KLIC 12, so as to account for their relations to (and standings vis-a-vis) other EKUs. The KLIC 12 may also store these articulations, such as for example in SIBOK repositories, in a manner that they may also be updated as determined or desired, such as for example in order to reflect the up-to-date state of given knowledge. SIBOKs may be embodied as databases employing one or more of various types of storage and networking, as discussed below.

FIGS. 15-20 show exemplary methods that may be employed in various system 10 embodiments, such as those shown in FIG. 1, via one or more processor-powered operations in one/more cores of the system 10, in combination with various inputs, outputs, storage, network, and/or other components, as may be described herein/elsewhere.

Figure 15:
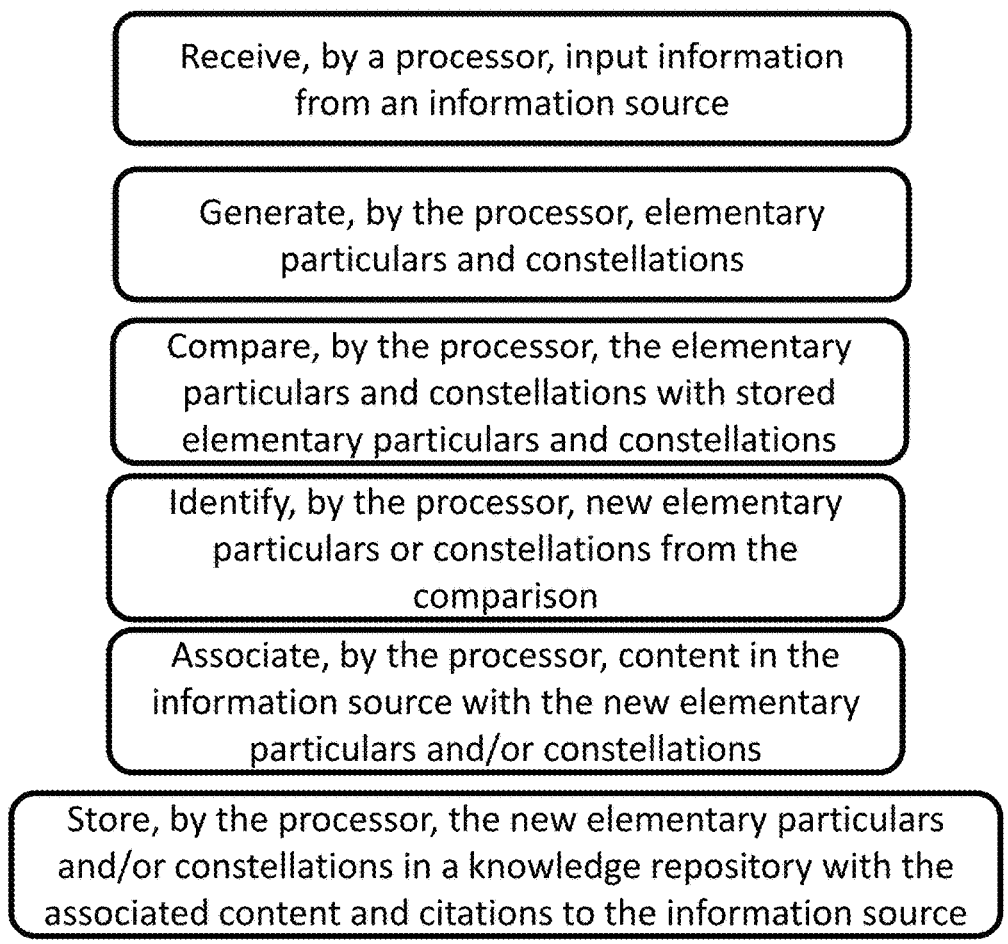

FIG. 15 shows exemplary methods of performing the intake from various sources, which may occur in the KLIC 12. Information may be received via an input and processed by the processor(s) in accordance with instructions, programming, and software that implement the invention's methods outlined heretofore, including with the use of NLP and machine learning techniques. EKUs and SIBOKs may be generated. These may be compared with stored EKUs and SIBOKs from previously analyzed, catalogued, and/or repositoried sources. New EKUs that were not found in the stored material may be identified through this process. These may then be catalogued, associated, cross-referenced, etc., based on content processed from the sampled/selected BOK and/or one/more additional IOAs, including information such as source citation, as well as associated/cross-referenced with other EKUs/SIBOKs, including newly processed ones. These may then be repositoried generally in a manner that allows also for further associating/cross-referencing, including also such that may be based on additional content (including citations to the IOAs). The one/more processors used to perform the above steps will be further described herein.

A SIBOK within the KLIC 12 may be created through 1) the processing of input IOAs so as to particularize the knowledge contained therein and/or to constellate the EKUs, 2) through importing EKUs/SIBOKs such as from one or more external knowledge repositories, or 3) through some combination of processing and importing. In any of such processes of creating a SIBOK and/or knowledge repository, the KLIC may or may not involve direct additional or substitutional input by the agent(s) (e.g., human supervision of machine learning processes, human curatorial guidance or feedback, editorial or ethical agency decision, etc.). The KLIC 12 machine-performed processes for particularizing knowledge and for constellating EKUs may involve instructions (such as programming or code written in any language or developed in any software environment) for statistical and/or for semantic processing of natural language (e.g., indexing textual corpora, identifying recurring keywords individually and/or in sequences, assessing correlations regarding distances and associations; semantically querying a corpus or corpora or parts thereof, semantically assessing natural language occurrences, semantically normalizing words or word sequences, etc.), that KLIC 12 may perform as separate steps in sequence or in parallel or interchangeably, or that KLIC 12 may integrate or combine as per additional instructions. In addition, the KLIC 12 machine-performed processes of particularizing knowledge and of constellating EKUs may involve computer code that has been "self-generated," i.e., output by computing processes possibly without human guidance or supervision, including when such code-generating process involved expert human guidance/supervision at an initial/earlier stage.

A significant weakness in the current state of the NLP art is that statistical processing of textual data, which generally relies upon "round-up" or "round-down" or "winner-take-all" decisions, has proven prone to effective malperformance (e.g., in 2016 Microsoft's Tay chatbot malperformed after bad actors fed it unethical/false statements in grammatically-correct form and at rates that led Tay to deduce statistically that the statements were semantically correct).

The present invention's knowledge particularization overcomes this type of issue through the semantic modelling of the EKU, and through the design of the EKU's operational architecture. The semantic meaning of the EKU is rather augmented by statistical processing of additional textual data (e.g., once a knowledge particular has been drawn, the discovery of its frequent re-occurrence in a given input of IOAs does not make it any "more true", but rather augments it such as with reference to the degree of statistical prominence of the articulation sources in a given BOK). The discovery and/or frequent re-occurrence of semantically contradictory statements does not invalidate an EKU or make it "more false" but rather augments it such as with reference to the occurrence of contradictions in a given BOK, optionally including their statistical frequency of occurrence. To illustrate, if a redundant reference source (such a new introductory textbook in a given scholarly field) is input into the KLIC 12 after semantically equivalent or overlapping sources were previously processed (such as course syllabi, lectures, and/or one/more other textbooks targeting the same field), no new EKUs or constellations may be generated when the previously-known EKUs are only repeated and no new EKUs are found present in the new IOA. The KLIC 12 may however annotate or cross-reference any relevant previously-inventoried EKUs/SIBOKs as to the semantic/statistical occurrences of the additional IOA. If, conversely, KLIC 12 draws a given semantic statement (e.g., "the world is flat") out of one/more IOAs (regardless of their number), this does not alter a knowledge particular of contrasting or opposed semantics (e.g., "the world is round") but rather augments it with annotation/cross-reference to the semantically-contradicting statement. In an additional illustration of the invention's EKU architecture, an EKU may also have a time reference associated with it, among other annotations (e.g., an EKU may include an articulation to the effect that "the proposition 'the world is flat' was generally accepted as true before, and not true after, the time of Christopher Columbus" or "the proposition 'the world is flat,' with the following annotations . . . , is contradicted by the proposition 'the world is round,' with the following annotations . . . ").

In various embodiments, the KLIC 12 may develop the contents of EKUs/SIBOKs also over time, so that, for example, it may be possible to associate additional content with the previously stored EKUs/SIBOKs. In application, any semantic content processed or output by KLIC 12 may be conditionally inspected and/or processed and/or decided upon by one or more agents; KLIC 12 may in addition also prompt for review and/or other feedback or decision by the agent(s). In practice, especially during the early stages of developing a SIBOK, it may be desirable to associate content from multiple IOA sources with a given EKU and/or constellation. Over time, it may or may not become less desirable to continue to associate additional content and/or new sources with certain previously processed EKUs/SIBOKs, e.g., so as to preserve computing/storage capacities.

Figure 16:
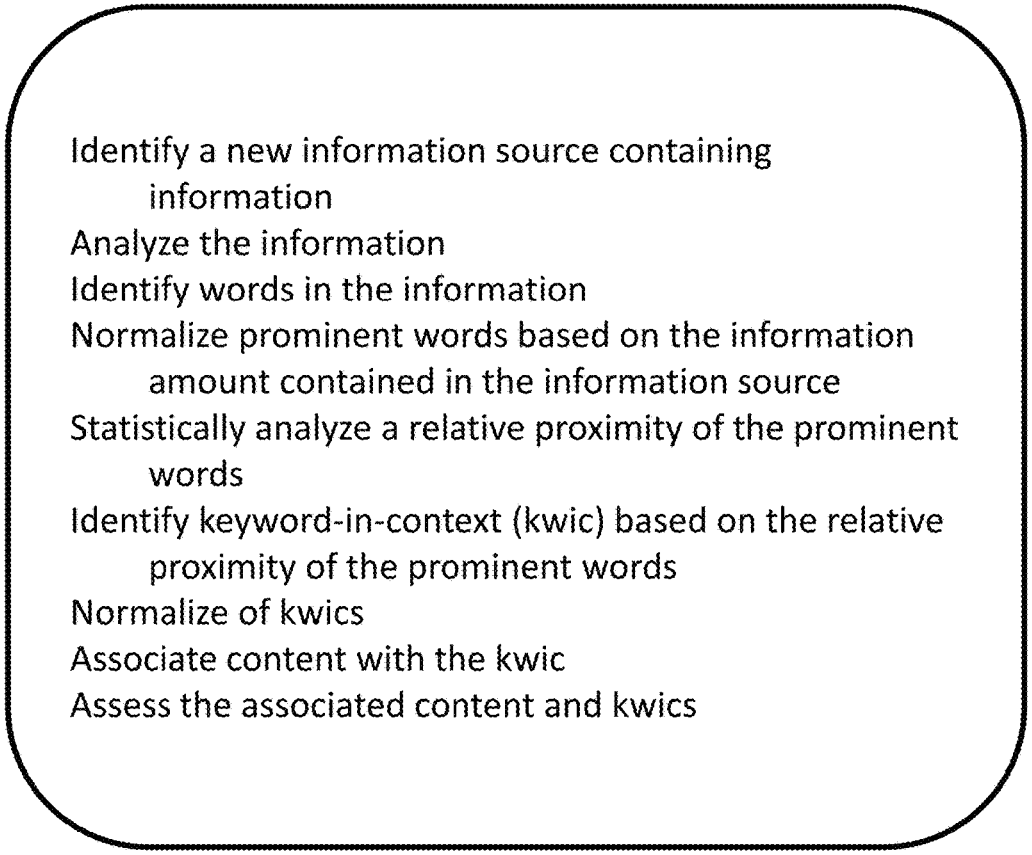

FIG. 16 shows various exemplary methods of performing the intake from various input sources. A target IOA may be identified by various methods, which may be automated and/or include the internet or linked databases (e.g., searching the web or a database for IOAs); manual, such as a curator selecting or seeking IOAs; aided by various tools and aids (e.g., optical scanners, audio transcribers); or any combinations thereof. The textual material from an IOA or any combination thereof may be input into the system 10 and analyzed so as to identify prominent words or prominent word sequences (such as keyword or keyword-in-context ("kwic") reoccurrences); normalization of these may further be performed so as for example to enable comprehensive comparisons and inclusive analyses across ranges of sources. KLIC 12 may perform further statistical/semantic processing before finalizing/storing an EKU and/or its relationships to other EKUs and/or other IOAs (i.e., constellation). One/more textual corpora formed out of IOAs may also be partitioned or re-combined, through manual or automatic procedures or combinations thereof; semantic and/or statistical significance may be determined also by using such partitions or re-combinations as the basis of processing at KLIC 12.

FIG. 17 and FIG. 18 show exemplary methods of identifying, adding, constellating, and cross-referencing EKUs, SIBOKs, and additional content to the system 10. Via input process(es) the KLIC 12 takes in one or more IOAs, which it treats as (including incorporates in) one or more textual corpora for statistical/semantic analysis. EKUs are then identified and produced based for example on the relative rates of occurrence of given words and phrases within the textual corpus, or through semantic methods, or through some combination of those. Constellations of EKUs may be further determined based for example on the relative proximity of EKU verbalizations and/or other observable occurrences in the textual corpora. The EKUs thus drawn, constellated, and/or provisionally repositoried, may further be compared to one or more other repositoried EKUs/SIBOKs (for example so as to identify EKUs/constellations that may not be present in any of the repositoried SIBOKs, etc.). EKUs/constellations may then be stored/referenced in/through one/more SIBOKs, including further associated with IOAs.

As EKUs may be catalogued and associated with other EKUs, additional associated or cross-referenced elements may be related to each-other in single/multiple dimensions. While EKUs may occur in or constitute "organic" constellations of knowledge, each EKU may also be treated as the center of a constellation surrounding it, with first-degree relations with (standings or ranking vis-a-vis) various other EKUs and/or associated/cross-referenced content giving rise to second-degree such relations/standings, whether within an "organic" constellation or across such constellations.

It will be appreciated that a skilled artisan may incorporate various NLP techniques (such as, for example, corpus cleaning, wherein certain punctuation or occurrences of common or non-substantive grammatical words and phrases or stopwords including for example "the", "a", "is", etc. are removed from a textual corpus or from an analytical process; word stemming/lemmatization; tokenization; etc.) within the scope of the present invention. Furthermore, as relative proximity within a textual corpus of raw or normalized words and word sequences may play a role in the KLIC 12 investigating potential relationships or determining relationships between EKUs, the skilled artisan may decide on various hard/soft thresholds for determining the transitions between degrees, e.g., first, second, third, etc. Similarly, the artisan may decide on certain specifics of storing of instructions, data and/or content for an EKU and its associated EKUs/constellations. (For example, certain types of content may be associated with a fixed or floating number of words including the EKU and first degree EKUs that may be sentence or paragraph based, and/or based on re-occurrence and/or range, etc. In various embodiments, it may be desirable to only store content associated with first degree EKUs, etc.)

In addition, various simplified illustrations for various of these invention's methods, systems, devices, and software associated with the KLIC 12 are included in this specification.

Conversational Teaching Cores (CTC)

The CTC 14 engages a learner in conversational-style exchanges of instances of natural language that generally are aimed at leading a learner to comprehend and to absorb knowledge of interest to the learner that, generally, was not previously known to the learner, including especially knowledge that is provisional and expansive in nature such as scientific knowledge. Via the CTC 14, learning is modulated to statements regarding EKUs that may be repeated (by the CTC 14 as well as by the learner, in any order) generally until the learner has comprehended (can articulate) them satisfactorily. As such, the CTC 14 involves processes of 1) implementation of learner conversational frameworks; 2) natural language generation (such as for outputting articulations of EKUs to the learner); 3) NLP, including both semantic and statistical analyzing, as well as combinations thereof (such as for analyzing the learner's articulations so as to be able to determine relevant EKUs/constellations, so as to assess the learner's verbalization skills and/or degree of knowledge mastery, and/or so as to discover the learner's knowledge gaps); 4) exchanging of inputs and information with other cores within systems 10 (such as KLIC 12, LRC 16, and CDC 18); and 5) information storage (especially temporary storage).

In various deployment scenarios, the CTC 14 may interface with a learner via the CDC 18, in real-time or otherwise, and also interface with the KLIC 12, one/more of KLIC 12 knowledge repositories (such as in order to select EKUs or articulations to convey to the learner and/or to assess against the learner's articulations) and also interface with the LRC 16 (such as in order to determine/record the learner's learning profile). For example, as the learner interacts with the CTC 14, the CTC 14 may identify EKUs from the learner's responses and retrieve information relevant to those EKUs from the KLIC 12 (such as, for example, in order to advance the learning experience or to correct knowledge gaps). The CTC 14 may then provide the knowledge to the learner in a context based on the learner's interaction with the system 10, and including in a way that elicits a response from the learner that may be used to assess whether, and/or to what extent, the knowledge was understood and/or absorbed by the learner.

The CTC 14 may also be interacting with the LRC 16 to document (store) its interactions with the learner for use in assessments/enhancements of the learning experience. Such documenting of the interaction may be further used to generate a learning profile that may be further used in various ways to further advance the learning process. The adaptation of a conversational exchange individually to a learner by the CTC 14 may be maintained primarily by the LRC 16, such that the CTC 14 and KLIC 12 may not include any learner information in various embodiments.

It will be appreciated that the input and output by the CTC 14 via the CDC 18 may be the same or different depending upon the system 10 configuration and may include one/more methods and sensory routes (e.g., audio, vocal, visual (text/graphical), touch, etc.), including in combination.

The conversational-style exchanges of the CTC 14 may be guided by one or more "learner conversational frameworks," i.e., conversational schemes which are generally implemented as software (and based on instructions, including conditional or looping instructions that may trigger the machine to "independently" generate additional instructions or code, including related to semantic content; and/or be based on such) and which are essentially directed towards optimizing (such as pedagogically) the learner's knowledge gains out of the conversational exchanges. Conversational frameworks intend to convey to a learner reliable semantic oversight over given domains of knowledge and/or reliable insight focused onto specific elements thereof, which the learner wishes to learn about or to absorb, through verbalizations that the learner comprehends, and/or in ways and/or styles that optimize the learner's comprehension. They may generally include conveying to the learner; in addition to the pithy articulations of EKUs and related semantic contents in words, pictures, etc. Also, systematic and representational overviews of constellations/SIBOKs and/or of the multiple ways in which EKUs may be related, in words, graphics, and/or additional sensory routes. For example, a given conversational framework may or may not start an introduction to a topic or area or subject etc. that a learner may wish to learn about with a semantic "definition" thereof, as commonly done in prior art, but rather with an overview of the domain of knowledge as obtained from KLIC 12 (e.g., "There appear to be 123 EKUs that this system has identified as components of 'Contemporary Sociocultural Anthropology' as defined by input from our curator. Eight of them appear to be the most central to the BOK, and 12 others are present in at least half of the relevant publications from the last decade. Would you like me to tell you about the most central eight and/or show you a relational map of the particulars, so you can select?"). Such learner conversational frameworks may be, in part or in full, developed through the input of one or more human experts (such as editorial or curatorial) and/or through implementation of computerized processes, including machine-performed processes triggered by self-generated code, and/or including implementation of NLP capabilities, including such as ones that may be available through open-source and/or proprietary repositories.

In various deployment scenarios for a learner conversational framework, depending upon the type of deployment of the system 10, the initial issuance of natural language by the CTC 14 towards a learner may be directed towards establishing a learner's identity, such as for example through prompting the learner to identify herself or himself. The CTC 14 may then query the LRC 16 to determine whether or not there exists in LRC 16 a learner profile for this individual, and/or whether other LRC 16 instructions/information may be applicable towards optimizing the learning outcomes of the conversational exchange. In the case of absence of a corresponding learner profile, the CTC 14 may typically invite the learner to create one and/or continue the conversational exchange with the learner so as to create such profile. Various aspects of the learner profile will be further described below with respect to the LRC 16.

In various deployment scenarios, in which a learner accesses the CTC 14 after being identified to the CTC 14 via the CDC 18, the conversational session's initial issuance of natural language by the CTC 14 towards a learner may be directed towards establishing the learner's intentions for the present conversational exchange (e.g., whether the learner wants to pick up where the last exchange was left off and/or revisit it; whether the learner wishes to converse on a specific EKU/constellation as outlined in previous conversations; whether the learner wishes to be introduced to a different EKU/constellation; etc.).

FIG. 19 shows exemplary methods of the system 10 interacting with a learner. For example, the CTC 14 may ask a first question concerning a first EKU to the learner via the CDC 18 and based on information provided by the LRC 16. The CTC 14 may also retrieve some or all of first-degree-associated-to-first-EKU EKUs from the KLIC 12, or elsewhere in the system 10, and possibly some/all of additional associated content. Upon receiving a first response to the first question, the CTC 14 may identify (elements of) one/more EKUs in the first response and compare those to corresponding (elements of) one/more EKUs accessed from the KLIC 12, so as to determine what may be considered present or absent from the learner's first response, if any. The CTC 14 may continue to ask further questions in which expected responses may include the retrieved (components of) EKUs not present in the first response. Upon receiving further responses to the further questions, the CTC 14 may retrieve additional content from the KLIC 12, such as for example to explain to the learner what was found missing/straying from the expected responses and to convey (and possibly re-convey) that content to the learner. If the learner provides responses that include one/more satisfactory articulations of the EKU and some or all of related EKUs (e.g., a first-degree constellation), the CTC 14 may proceed to discuss other specific EKUs in a targeted SIBOK.

As a conversational exchange progresses, the CTC 14 may, through assessing the learner's verbalizations, determine that the learner has or has not achieved the desired mastery of the targeted EKUs/SIBOKs. The CTC 14 may also probe the learner to state relationships between EKUs, including between EKUs of different SIBOKs. The CTC 14 may also identify in a learner response a specific word sequence or a variant thereof that may represent only a partial semantic match with a given EKU's repositoried verbalization; the CTC 14 may then prompt the learner for additional articulations and/or even offer the learner the opportunity to determine on her/his own whether/how her/his articulation(s) of the EKU in question resemble/differ from the system 10's. The CTC 14 may typically seek a confirmatory response that the learner understands the present EKU/SIBOK by directly asking the learner. The CTC 14 may typically also allow the learner to redirect a conversational exchange away from a direction of progression devised by the CTC 14, including by specifically asking the learner whether the devised progression may need to be redirected and/or whether the learner desires to point the conversational exchange towards a different direction/goal of learning.

Figure 21:
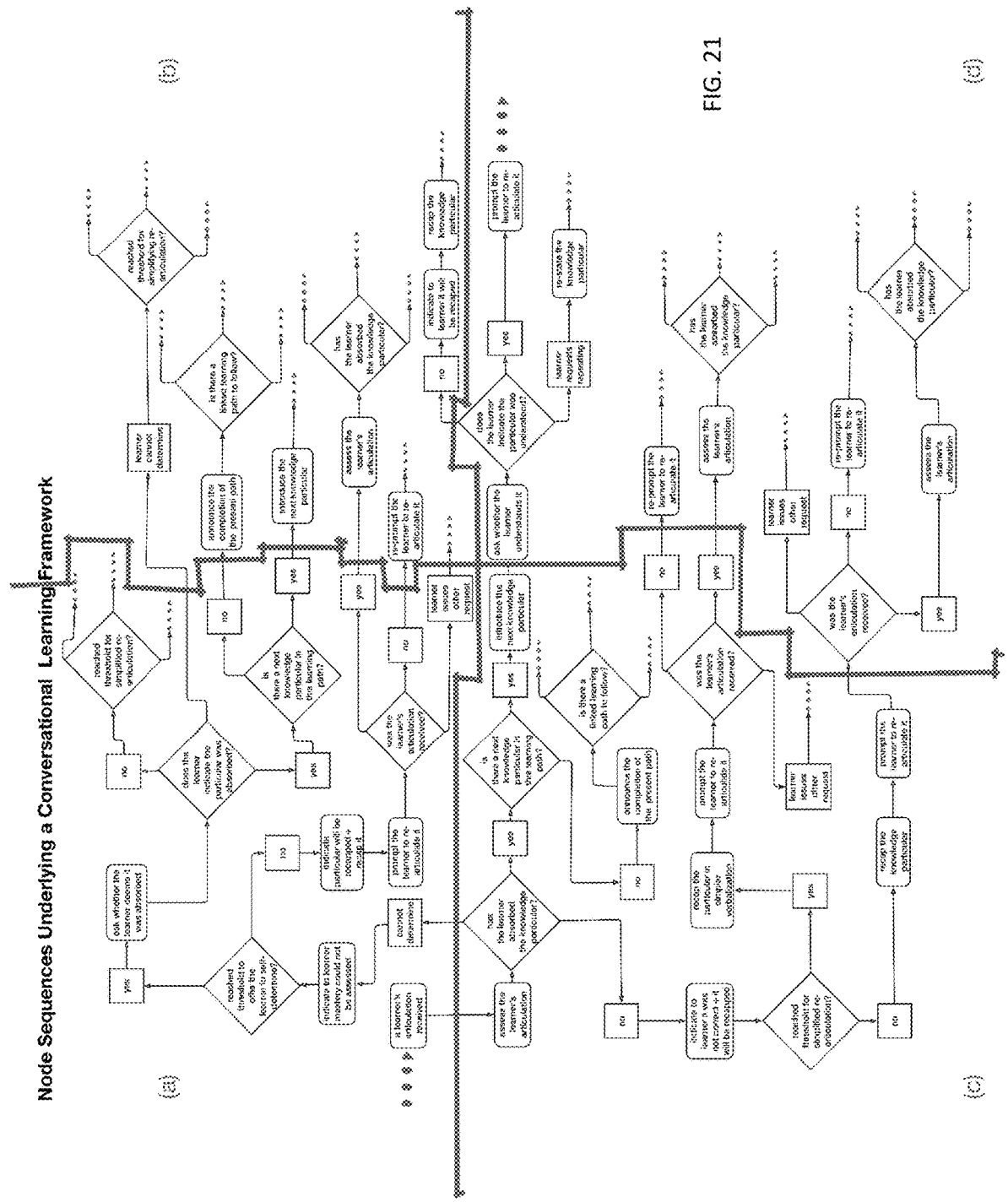
Figure 21A:
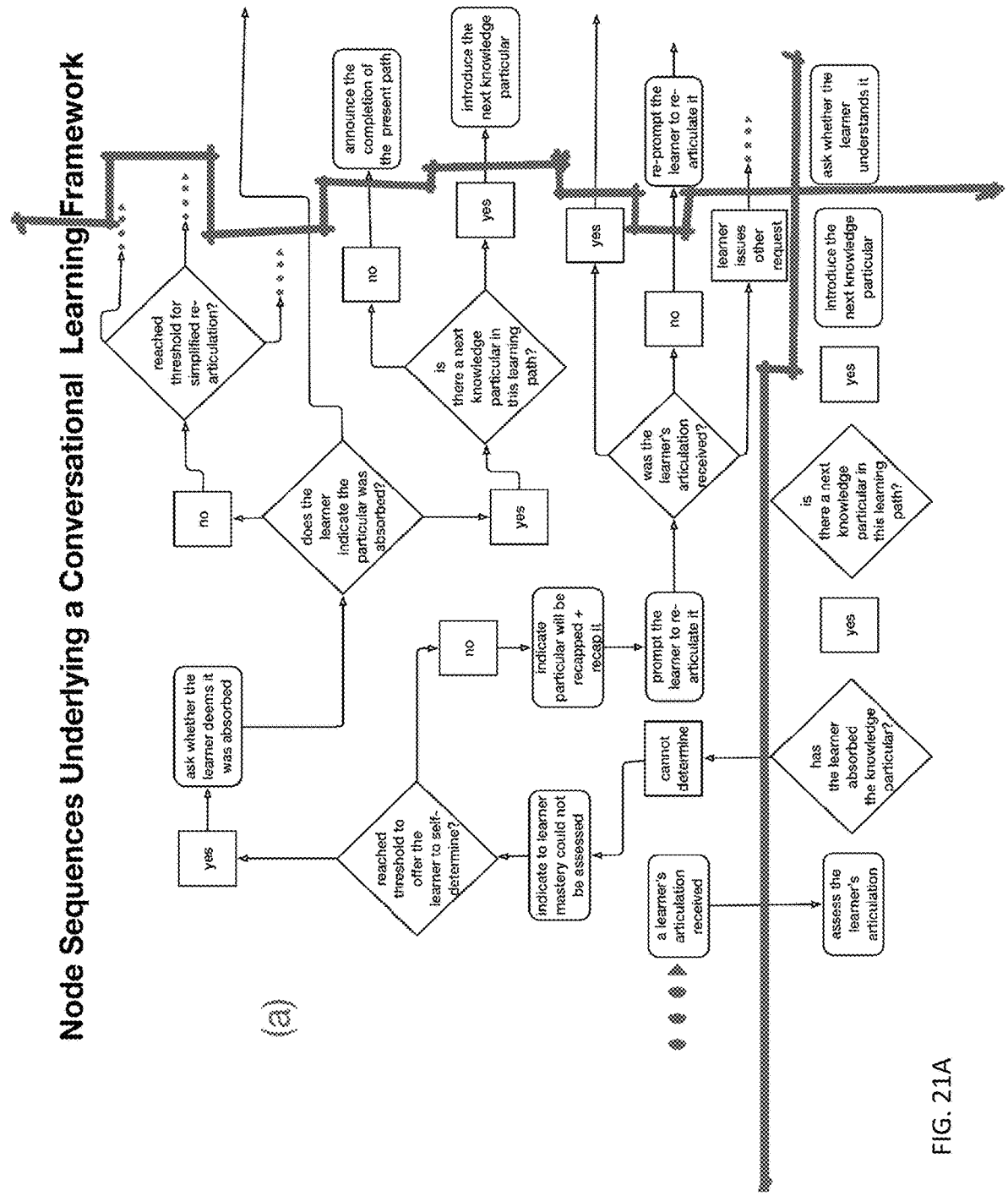
Figure 21B:
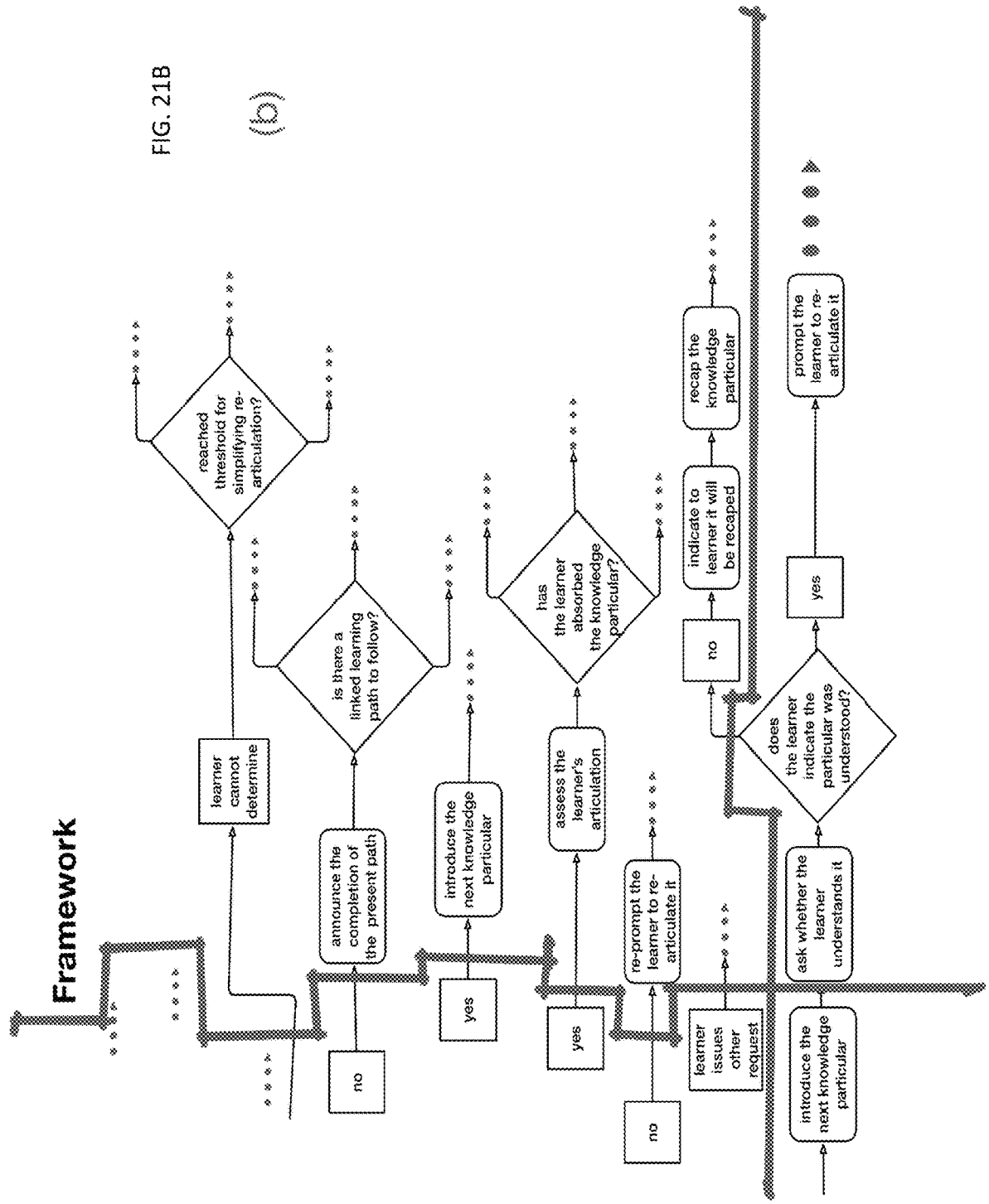
Figure 21C:
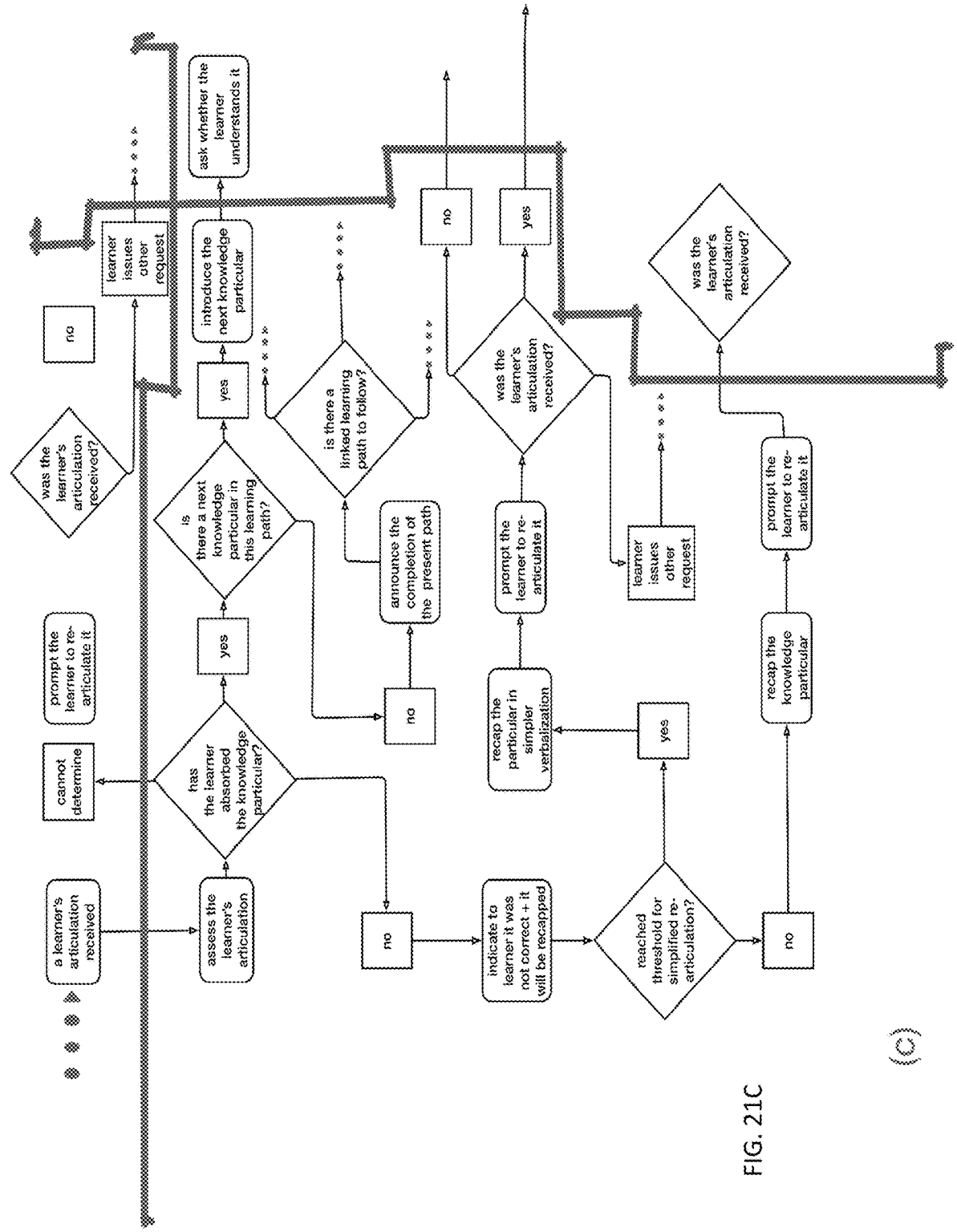
Figure 21D:
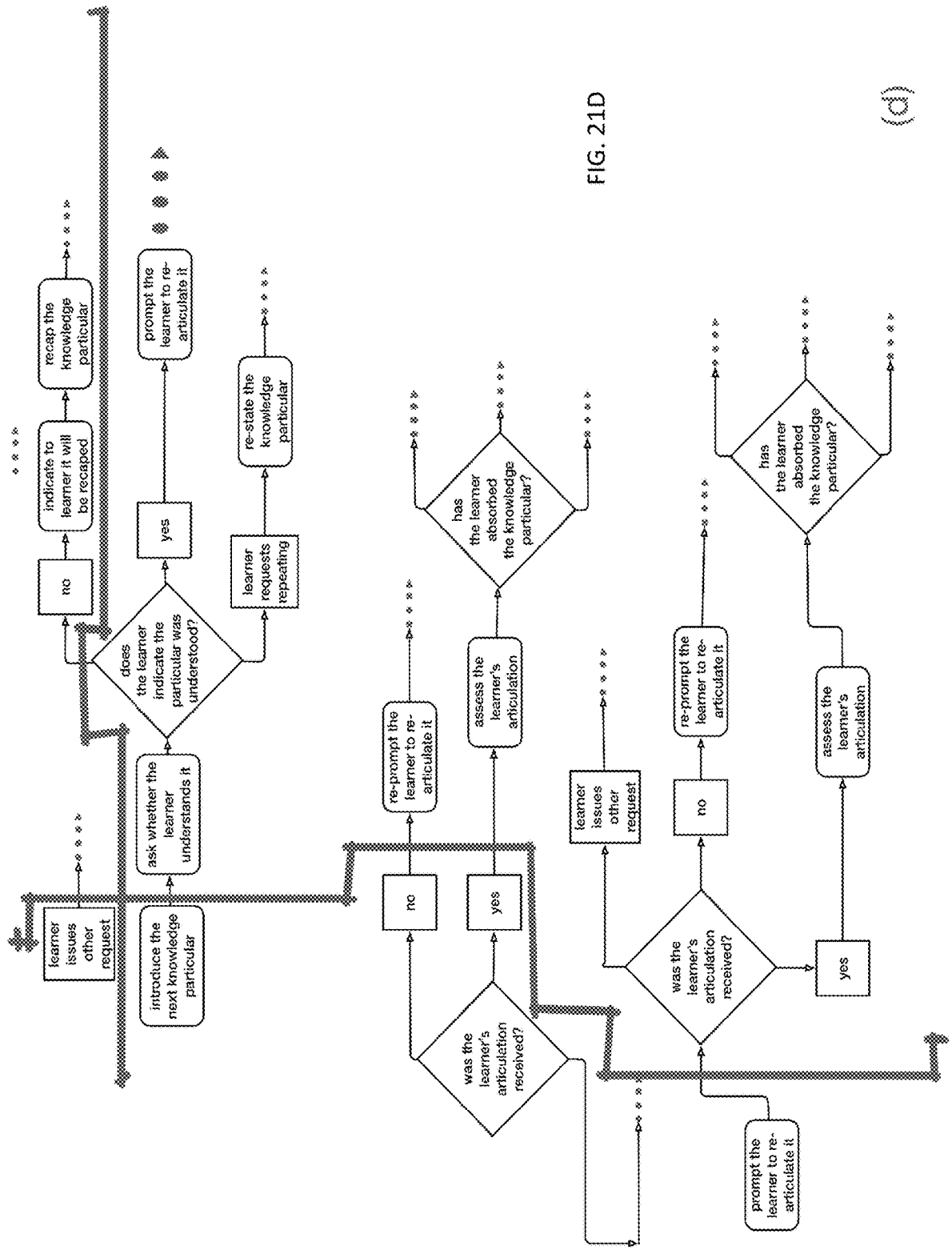

In addition, FIG. 21 provides a simplified illustration for various of the invention's methods with regard to conversational dynamics as driven by interconnected nodes that underlie the invention's conversational learning frameworks discussed heretofore. FIG. 21 may be viewed in four sections (a)-(d) in FIGS. 21A-21D, respectively, which present the sections in a larger font. As illustrated, such a conversational learning framework channels the flow of the system 10's conversational exchange with a learner so as to optimize the learner's learning outcomes. Conversational learning frameworks may be directed by one/more system 10s and/or implemented in software/hardware, including in combination; as illustrated, they may involve/integrate conceptual/content elements (including EKUs/SIBOKs) with decision-making elements (such as with regard to the progress of a conversational/learning exchange) as well as with additional including semantic and other elements (such as assessment of a learner's verbalizations, decision-making such as with regard to the adjustment of the direction of progress of a conversational/learning exchange as per considerations based on a learner's profile, etc.); etc.

In operation and in practice, a learner may request the system 10 to be configured to teach for example one/more of certain commonly recognizable academic subjects (e.g., biology, geology, economics) and/or bespoke BOKs (e.g., "most prominent new knowledge in organic chemistry as indicated by this year's engagement of last year's peer-reviewed papers in which this new knowledge was first communicated"). The initial conversation may then begin with an introduction of the targeted subject by the system 10. The system 10 may enable a learner to initiate the conversational exchange with a question and/or to direct the conversational exchange (e.g., allowing for a learner to ask "What is biology?" or "What were the most prominent new developments in organic chemistry last year?" etc.). The CTC 14 may then identify and retrieve relevant SIBOKs/EKUs and/or additional information/articulations from the KLIC 12 and convey them to the learner through integrating them through an appropriate conversational framework.

At various instances/installments of conversational exchanges, including when a learner starts to learn about a previously-unknown targeted topic/subject/domain, the CTC 14 may optionally ask the learner to articulate a definition for a given EKU such as for example one that may be of importance in one/more SIBOKs that the system 10 has identified/designated as relevant to (or as constituting components of) the knowledge or learning topic/subject/domain targeted by the learner. For example, the CTC 14 may ask a learner a question to the effect of "How would you, right now, for what you know, define 'biology'?" possibly even prior to having conversed about it with the learner (i.e., prior to having offered the learner the repositoried EKU articulation). Upon receiving the response, the CTC 14 may then analyze it for what it contains/misses as compared to the relevant EKU/SIBOK repositoried in KLIC 12, and proceed accordingly. The CTC 14 may further query the learner, including provide the learner with (additional/ongoing) opportunity to identify knowledge that was previously missing (or straying from the relevant repositoried). If the previously-absent/incorrect (components of) EKUs/SIBOKs remain problematic, then the CTC 14 may proceed to make them the focus of further/future conversational exchanges.

The learner conversational framework provides also for conversational exchanges in which there may be no direct response from the learner to a question posed by the CTC 14, but instead the learner may indicate that she/he cannot for example articulate a requested definition or is entirely unfamiliar with a given domain of knowledge. (Keeping with the illustration above, the learner may answer the CTC 14 to the effect that "I never heard the word 'biology'" or "I am not sure how to define 'biology'" or simply "I forgot" etc.). In such a case the CTC 14 typically may proceed with conveying the targeted EKU to the learner and/or with making it the focus of further/future conversational exchanges.

As a learner demonstrates her/his knowledge of an EKU, the CTC 14 may move along to various other EKUs in a SIBOK and interact with the learner on those particulars, generally starting such progression with the EKUs that are immediately connected to those previously learned (i.e., based on how such EKUs may be related within a constellation, e.g., by way of semantic relationship, by way of distance/occurrence in a BOK sampling, etc.). Returning to a prior example, the CTC 14 may identify in the learner's response to the question "What is biology?" words such as "study" and "living" and "organism," linked in a semantically satisfying order, and which, upon comparison to the relevant EKU's entry obtained from the KLIC 12, indicate to the CTC 14 that the learner knows the definition of biology. When the learner has demonstrated mastery of a specific EKU, the CTC 14 may ask about the direction in which the learner would like then to take with the learning interaction, while generally also providing the learner with insight into one or more paths that the system 10 may have identified as befitting such progression (such as in view of the properties of a relevant constellation as provided by KLIC 12 as well as in view of the learner's learning profile as provided by LRC 16). Keeping with the illustration above, the CTC 14 may invite the learner to indicate whether there are specific types of organisms that the learner would like to learn about, such as for example out of a given selection of organisms that the CTC 14 may present to the learner as potentially relevant learning targets to choose from in light of their historical or present prominence in biology (e.g., Galapagos tortoises, asexual worms, etc.). In various embodiments of the invention, the CTC 14 may also inquire whether the learner wishes for the system 10 to assess the learner's knowledge of one/more additional EKUs/SIBOKs (furthering the illustration, the CTC 14 may prompt the learner to "talk about fruit flies" or to "describe why fruit flies are used in experiments on aging" etc.).

The CTC 14 may move between EKUs during a conversation, as the properties of a given SIBOK may suggest, and, generally, as guided by a conversational framework. In addition, various visualizations of the invention's constellation methods are also included in this specification in FIGS. 8-10. In various embodiments of the invention, EKUs and constellations may also be envisioned as a mesh with the EKUs serving as nodes and constellations providing the links between the nodes. The CTC 14 will traverse the mesh moving from EKU to EKU based on the constellation information, which provides the links/paths. It will be appreciated that such a mesh may also be continuous in some areas and discontinuous in others. For example, a given EKU may be constellated with only one other EKU, providing an end node of sort in the analogy. At that point, the CTC 14 may return the focus of the interaction with the learner to the most recent EKU and traverse that way to another path, may re-direct the focus of the conversational exchange to an EKU that was covered even earlier and/or continue through there onto another path, may switch the focus of the communication with the learner onto a different EKU/constellation, etc., depending upon the how the system 10 is configured, depending upon the guidance of a conversational framework, and/or depending upon how the learner has indicated that she/he would like to proceed.

FIG. 20 shows additional methods for checking and updating knowledge in the system 10. In addition to analyzing the knowledge of the learner, the CTC 14 may also be employed for analyzing its own performance and/or the quality of the knowledge provided to the learner. The CTC 14 may receive a first question from a learner, and/or through a same/separate/additional/parallel/etc. channel, also receive a question from one or more agents or administrators of system 10. The system 10, typically via the CTC 14, will identify one/more EKUs that are semantically related to that in the first question. EKUs may be used to retrieve at least one of first content/degree constellations associated with the EKUs in the first question from a first database, and also to retrieve at least one of second content/degree constellations associated with the EKU in the first question from a second database. The retrieved content and/or constellations from the different databases may be compared and any difference that may be identified may be reviewed by a human supervisor so that, if necessary, a SIBOK or knowledge repository may be improved. In various embodiments, the CTC 14 may send information to the KLIC 12 regarding one/more responses received from one/more learners in relation to one/more EKUs/SIBOKs for processing/storing. The KLIC 12 may be able to employ such information so as to evaluate the semantic and/or referential contents associated with an EKU. If needs for adjustments/clarifications arise (e.g., when there is indication that a verbalization triggers misunderstanding), which the KLIC 12 determines may not be resolvable within the operational means of the KLIC 12, then the KLIC 12 may prompt the involvement of a human administrator of the system 10.

Figure 22:
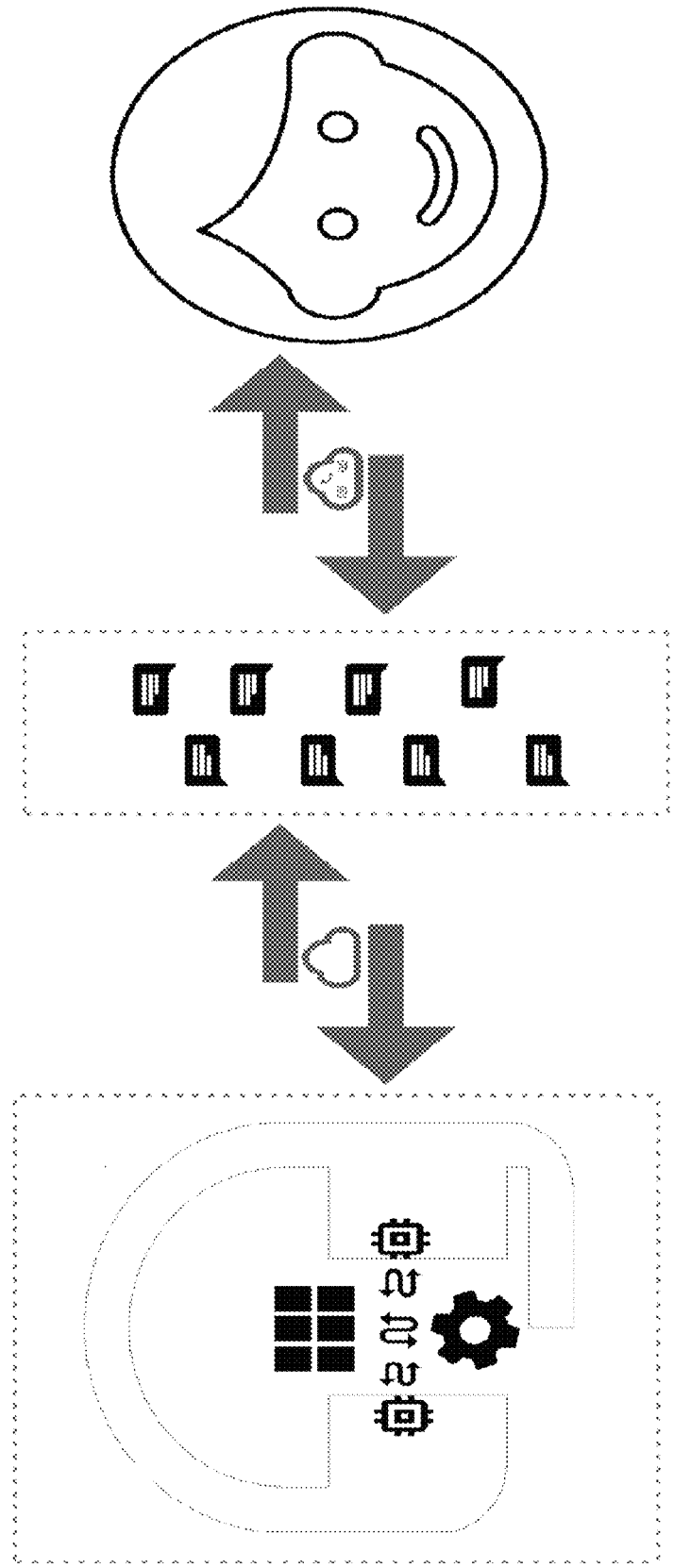

In addition, various simplified illustrations for various of these invention's methods, systems, devices, and software associated with the CTC 14 are included in this specification as FIGS. 22 and 14.

Learner Registry Cores (LRC)

The LRC 16 communicates with the CTC 14 as well as with the CDC 18. For each individual learner engaging the systems 10, the LRC 16 may store an individual learning profile out of information received from the CTC 14 and from the CDC 18. A learner's profile in the LRC 16 provides for the logging and tracking of learning progress, as well as for identifying areas of strength/weakness that may be used by the CTC 14, and/or also by the learner directly, so as ultimately to aid the learner with mastering knowledge. The learner may access the LRC 16 via the CDC 18 to review her/his progress, to update certain information in the profile, etc. In practice, the LRC 16 may be implemented as a database that may be accessed by one or more processors in the LRC 16 and/or the CTC 14 and/or the CDC 18 depending upon configuration of the system 10. The LRC 16 may be executed on the same or a different physical or virtual machine(s) as the CTC 14, CDC 18, and KLIC 12, and it may involve instructions/software stored on a non-transitory computer readable medium.

In various embodiments or deployment scenarios, the system 10 may generally issue a virtual teacher avatar for each field of knowledge (i.e., one/more BOKs/SIBOKs) that a learner may wish to master. The virtual teacher avatars may generally also be stored and maintained in and by the LRC 16 in connection with individual learner profiles. Over time, a learner engaging system 10 may generally accumulate one/more virtual teacher avatars.

In various deployments, such an avatar will identify itself clearly as distinct from being human and point up rather than camouflage its being "virtual" and/or "artificial" so as to avoid distractions and unfulfillable expectations that plague the present state of the art of "assistants" powered for example by various "artificial intelligence" algorithms seeking to present themselves as humans. For the learner, the virtual teacher avatar will, through its primarily conversational identity, blend-in-one the key functions of 1) a teacher who is fully immersed in a specific knowledge field, 2) a personal tutor dedicated to its only tutee, 3) an academic counselor who is knowledgeable about the best routes towards a learner's learning goals, 4) a reliable and agile registrar. As maintained and stored by and in the LRC 16, such virtual teacher identities will be bound to a specific learner: each one virtual teacher avatar/identity of each one field of knowledge will be issued individually to just one human learner and will be dedicated solely to its one human learner's mastering of that field of knowledge.

In various embodiments or deployment scenarios, the LRC 16 learner profiles may substantially evolve over time, including by expansion of the suite of virtual teacher identities/avatars. Over time, and in accordance with individual interests and intentions, different learners may amass unique collections of virtual teachers in their virtual teacher suites. Such virtual teachers themselves may evolve over time in unique ways reflecting the ways in which an individual's learning interests, abilities, and knowledge evolve. (For example, one individual learner's suite may start with a virtual teacher of chemistry but over time come to also include a virtual teacher of molecular biology, a virtual teacher of biomaterials science, a virtual teacher of business economics, and perhaps also other virtual teachers, all of them uniquely adapted to causing the achievement of that individual learner's goals of mastering knowledge in those fields. Meanwhile another human learner's suite may over time come to consist of a virtual teacher of political science, a virtual teacher of astronomy, a virtual teacher of immunology, and perhaps also other virtual teachers, each one of them uniquely adapted to this one individual learner's unique and uniquely evolving combination of learning interests, career intentions, conversational style, availability of time, as well as lifestyle more broadly.) However, any such virtual teacher may optionally also be aware of the learner's knowledge and learning attributes that have been developed and recorded by the other virtual teachers. Thus, a virtual teacher in one knowledge area may be able also to reference the learner's knowledge in other knowledge areas during the learning process.

Figure 23:
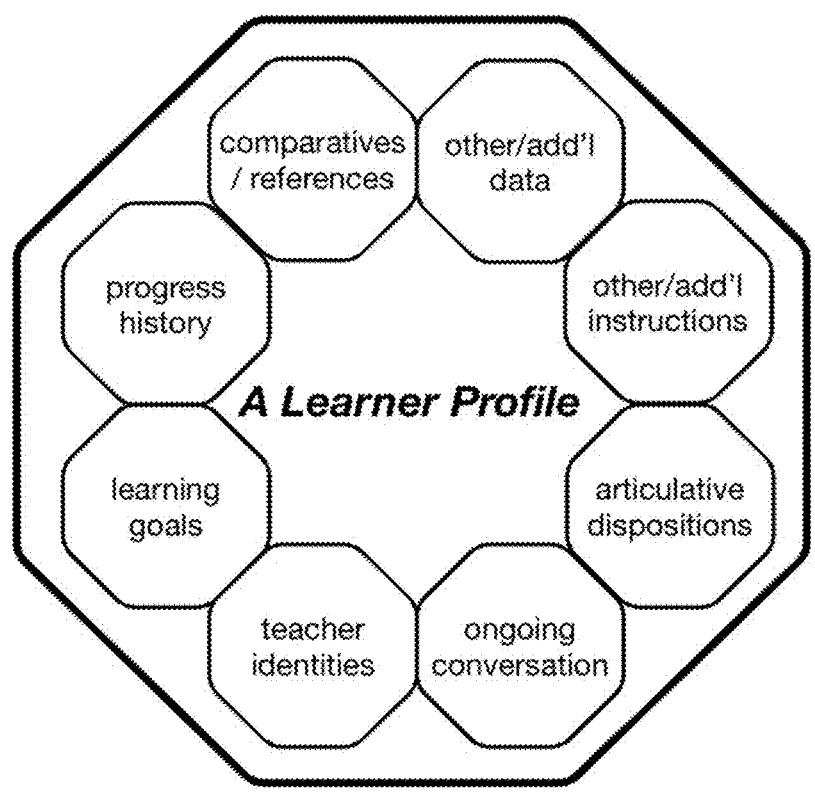

In addition, various simplified illustrations for various of these invention's methods, systems, devices, and software associated with the LRC 16 are included in this specification as FIGS. 22, 8, 14, and 23. For example, FIG. 22 illustrates an exemplary aspect of the invention in which a human learner absorbs knowledge through the invention's method of conversational learning with an avatar or a virtual identity for a teacher, where the avatar/identity presents itself as not a human (though conversing in natural language). FIG. 23 illustrates an exemplary aspect of the invention in which a learner profile, such as maintained in a Learner Registry Core, includes inter-accessible software/hardware/firmware nodes of instructions and data for a learner's articulative dispositions, teacher identities, learning goals, history of learning, comparisons and/or references to other relevant data, as well as additional data/instructions, which may be employed so as to optimize an ongoing conversational exchange with a learner, as well as to produce additional data and/or instructions, including to the effect of updating these very nodes.

Commercial Deployment Cores (CDC)

The CDC 18 provides the implementation interfaces that enable the system 10 to be deployed in a commercial setting, such as via cloud service, and the interaction with web/mobile/internet-of-things devices, as well as integration with a payment system, and/or other auxiliary resources useful in implementing and/or disseminating/commercializing services according to the present invention (e.g., data/network security). Similar to the isolation of personalization information in the LRC 16, it may be desirable to maintain the network and device information isolated in the CDC 18. The CDC 18 may also be involved with choreographing the learner's interfacing with the CTC 14 and the LRC 16.

In addition, a simplified illustration for various embodiments of the inventive methods, systems, devices, and software associated with the CDC 18 is included in this specification within FIG. 22 as intermediating the conversational exchange between the system 10 and a human learner.

Computing Resources

Figure 24:
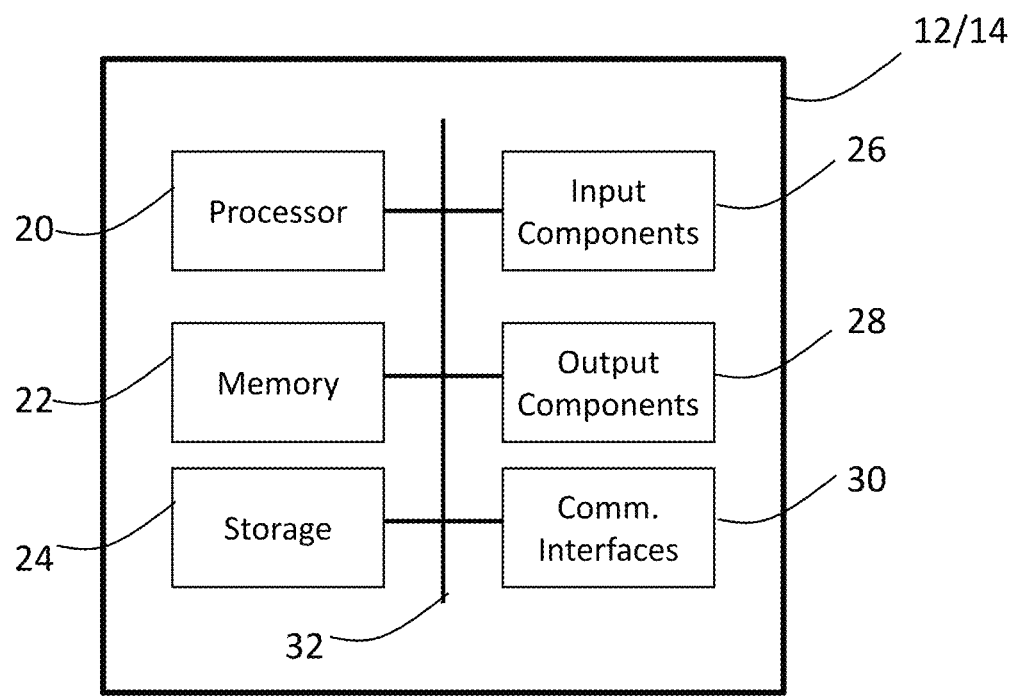
FIG. 24 illustrates exemplary components in various computing resources of the invention.

FIG. 24 illustrates exemplary component embodiments that may be employed in the KLIC 12, CTC 14, LRC 16, CDC 18 and user devices ("computing resources") of the system 10. The computing resources may each include one or more processors 20, memory 22, storage 24, input components 26, output components 28, communication interfaces 30, as well as other components that may be interconnected as determined or desired by the skilled artisan via one or more buses 32. It will be appreciated that the system 10 may include or involve various computing, storage, and networking devices, e.g., servers, computers, routers, switches, gateways, etc., and may access data and databases on various storage devices, as well as processing environments and/or software frameworks that may be owned or controlled by one or more different entities.

Processor(s) 20 may include one or more central processing units (CPU), graphics processing units (GPU), accelerated processing units (APU), microprocessors, and/or any processing components, such as a field-programmable gate arrays (FPGA), application-specific integrated circuits (ASIC), etc.), etc., manufactured out of any materials and/or media, that interpret and/or execute instructions. The processors 20 may contain cache memory units for temporary local storage of instructions, data, or computer addresses and may be implemented as a single-chip, multiple chips and/or other electrical components including one or more integrated circuits and printed circuit boards that implements and executes logic in hardware, in addition to executing software.

Processor(s) 20 may connect to other computer systems and/or to telecommunications networks as part of performing one or more steps of one or more processes described or illustrated herein, according to particular needs. Moreover, one or more steps of one or more processes described or illustrated herein may execute solely at the processor 20. In addition, or as an alternative, one or more steps of one or more processes described or illustrated herein for execution in one processor may be executed at multiple CPUs that are local or remote from each other across one or more networks.

The computing resources of the system 10 may implement processes employing hardware and/or firmware and/or software to provide functionality via hardwired logic or otherwise embodied in circuits, such as integrated circuits, which may operate in place of or together with software to execute one or more processes (including one/more steps of one/more processes) described or illustrated herein. Software implementing particular embodiments may be written in any suitable programming language or framework (e.g., procedural, object oriented, etc.) or combination of programming languages, where appropriate.

In various computing resources, hardware processor modules may include processors 20 that range, for example, from general or specific purpose processors to field programmable gate arrays (FPGA) to an application specific integrated circuits (ASIC), and combinations thereof. Software modules (stored and executed via hardware) may be expressed in a variety of software languages (e.g., computer code), including C, C++, Java, Javascript, Rust, Go, Scala, Ruby, Visual Basic, FORTRAN, Haskell, Erlang, Pearl, Python, R, and/or other object-oriented, procedural, or other programming language and processing environment and development tools. Computer code may include micro-code or micro-instructions, machine instructions, such as produced by a compiler, code used to produce a web service, and files containing higher-level instructions that are executed by a computer using an interpreter and employ control signals, encrypted code, and compressed code, including also code that is the output of processes referred to as "machine learning," supervised/unsupervised "training," and/or residing in "neurons," "layers of neurons," "neural networks," etc.

Memory 22 may include random access memory (RAM), read only memory (ROM), and/or another type of dynamic/static storage device, such as flash, magnetic, and optical memory, etc. that, whether local/remote and/or distributed/accrued over a network, stores information and/or instructions for use by processor 20. The memory 22 may include one or more memory cards that may be loaded on a temporary/permanent etc. basis. Memory 22 and storage 24 may include a subscriber identification module (SIM) card and reader.

Storage components 24 may store information, instructions, and/or software related to the operation of the system 10 and computing resources. Storage 24 may be used to store operating system 10, executables, data, applications, and the like, and may include fast access primary storage, as well as slower access secondary storage, which may be virtual, distributed, fixed, etc.

Storage component(s) 24 may include one or more transitory and/or non-transitory computer-readable media that store or otherwise embody software implementing particular embodiments. The computer-readable medium may be any tangible medium capable of carrying, communicating, containing, holding, maintaining, propagating, retaining, storing, transmitting, transporting, or otherwise embodying software, where appropriate. The computer-readable medium may be a biological, chemical, electronic, electromagnetic, infrared, magnetic, optical, quantum, or other suitable medium or a combination of two or more such media, where appropriate. The computer-readable medium may include one or more nanometer-scale components or otherwise embody nanometer-scale design or fabrication. Examples of computer-readable media include (but are not limited to) fixed and removable drives, application-specific integrated circuits (ASICs), CDs, DVDs, field-programmable gate arrays (FPGAs), floppy disks, optical and magneto-optic disks, hard disks, holographic storage devices, magnetic tape, caches, programmable logic devices (PLDs), random-access memory (RAM) devices, read-only memory (ROM) devices, semiconductor memory devices, solid state drives, cartridges, and other suitable computer-readable media.

Input components 26 and output components 28 may include various types of input/output (I/O) devices. I/O devices may include graphical user interfaces (GUIs) providing easy-to-use visual interface between the user and system 10 and access to the operating system 10 or application(s) running on the devices.

Input components 26 receive any type of input in various forms from humans or machines; examples include (but are not limited to) touch screen and video displays, keyboards, keypads, mice, buttons, track balls, switches, joy sticks, directional pads, microphones, cameras, transducers, card readers, voice and handwriting inputs; various hardware ports/hubs (e.g., universal serial bus), various software/data ports/hubs (e.g., application programming interface); various sensors (e.g., for sensing information such as temperature, location via global positioning system (GPS) or otherwise), accelerometer, gyroscope, actuator data, which may be input via a component in the user device 12 or received via one or more communication interfaces 30.

Output component 28 may include displays, speakers, lights, ports/hubs, sensor information. Similar to the input, the output may be provided via one or more ports and/or one or more communication interfaces 30.

Communication interface 30 may include one or more transceivers, receivers, transmitters, modulators, demodulators that enable communication with other devices, via wired and/or wireless connections. Communication interface 30 may include Ethernet, optical, coaxial, universal serial bus (USB), infrared, radio frequency (RF) including Wi-Fi, WiMax, cellular, Bluetooth, etc. as described herein and known in the art.

Bus(es) 32 may connect a wide variety of other subsystems and may include various other components that permit communication among the components in the computing resources. The bus(es) 32 may encompass one or more digital signal lines serving a common function, where appropriate, and various structures including memory, peripheral, or local buses using a variety of bus architectures. As an example, and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, and an Accelerated Graphics Port (AGP) bus.

The computing resources of the system 10 may provide functionality as a result of the processors 20 executing software embodied in one or more computer-readable storage media residing in the memory 22 and/or storage 24 and logic implemented and executed in hardware. The results of executing the software and logic may be stored in the memory 22 and/or storage 24, provided to output components 28, and transmitted to other devices via communication interfaces 30. In execution, the processor 20 may use various inputs received from the input components 26 and/or the communications interfaces 30. The input may be provided directly to the processor 20 via the bus 32 and/or stored before being provided to the processor 20. Executing software may involve carrying out processes or steps that may include defining data structures stored in memory 22 and modifying the data structures as directed by the software.

About this Specification

The foregoing disclosure provides examples, illustrations and descriptions of the present invention, but is not intended to be exhaustive or to limit the implementations to the precise form disclosed. Modifications and variations are possible in light of the above disclosure or may be acquired from practice of the implementations. These and other variations and modifications of the present invention are possible and contemplated, and it is intended that the foregoing specification and the following claims cover such modifications and variations.

As used herein, the term component is intended to be broadly construed as hardware and software, and/or a combination of hardware and software, including firmware, etc. It will also be apparent that systems and/or methods, described herein, may be implemented in different forms of hardware and software, or combinations thereof. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured such as to a standard configuration, a specific configuration based on a type of device on which the user interface is displayed, and/or a set of configurations based on capabilities and/or specifications associated with a device on which the user interface is displayed.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items and may be used interchangeably with "one or more" or "one/more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of generating a systematized body of knowledge comprising:
   defining a body of knowledge by at least one knowledge constraint, the body of knowledge being a set of elementary knowledge units related to the at least one knowledge constraint and the at least one knowledge constraint including at least one subject;
   obtaining, by at least one processor, a plurality of instances of articulations meeting the at least one knowledge constraint;
   forming, by the at least one processor, a textual corpus from the plurality of instances of articulations;
   identifying, by the at least one processor, elementary knowledge units in the textual corpus, the elementary knowledge units being statements in the textual corpus that convey knowledge related to the body of knowledge; and,
   generating, by the at least one processor, a systematized body of knowledge by inventorying the identified elementary knowledge units, the inventory including at least one of number of occurrences of each identified elementary knowledge unit in the textual corpus and relative proximity of each identified elementary knowledge unit to other identified elementary knowledge units in the textual corpus.

2. The method of claim 1, further comprising:
   conveying knowledge from the body of knowledge to a user in the form of at least one elementary knowledge unit in response to a query by the user.

3. The method of claim 1, further comprising:
   obtaining at least one additional instance of articulations not in the textual corpus meeting the at least one knowledge constraint;
   identifying elementary knowledge units in the at least one additional instance of articulations; and,
   generating an additional inventory of the identified elementary knowledge units in the at least one additional instance of articulations based on at least one of a number of occurrences, and relative proximity to other elementary knowledge unit, of the identified elementary knowledge units in the at least one additional instance of articulations.

4. The method of claim 3, further comprising at least one of:
   comparing the additional inventory with the systematized body of knowledge to identify differences between the additional inventory and the systematized body of knowledge; and
   generating a record of the differences between the additional inventory and the systematized body of knowledge.

5. The method of claim 1, further comprising:
   obtaining at least one additional instance of articulations not included in the textual corpus;
   identifying elementary knowledge units in the at least one additional instance of articulations;
   generating an additional inventory of the identified elementary knowledge units in the at least one additional instance of articulations based on at least one of a number of occurrences, and relative proximity to other elementary knowledge units, of the identified elementary knowledge units in the at least one additional instance of articulations; and,
   identifying elementary knowledge units in the at least one additional instance of articulations that are also in the systematized body of knowledge.

6. The method of claim 5, further comprising:
   defining a new body of knowledge when the at least one elementary knowledge unit identified in the at least one additional instance of articulations is not present in the systematized body of knowledge; and
   associating the additional inventory with the new body of knowledge.

7. The method of claim 1, further comprising:
   comparing two elementary knowledge units to determine whether the two elementary knowledge units provide different lexical forms of one selfsame semantic representation; and
   defining one of the elementary knowledge units as the lexical uniform of the semantic representation that uniforms the two different lexical forms of the selfsame semantic representation into one single elementary knowledge unit.

8. The method of claim 1, where the statement of knowledge includes different lexical forms of one selfsame semantic representation including articulations in different languages.

9. The method of claim 1, further comprising:
   querying, by at least one of the processor and the user, for at least one elementary knowledge unit included in the inventory, the semantic relationship of at least one instance of articulations to the at least one elementary knowledge unit,
      the semantic relationship being one of affirmation, absence of affirmation, denial, absence of denial, augmentation, and absence of augmentation; and,
   generating, by at least one of the processor and the user, a compilation of the semantic relationship for the at least one elementary knowledge unit.

10. The method of claim 1, further comprising:
    regenerating the systematized body of knowledge after adding at least one elementary knowledge unit to the systematized body of knowledge.

11. The method of claim 1, where the body of knowledge includes at least one elementary knowledge unit that is identified based on at least one of a number of occurrences, and the relative proximity to at least one other elementary knowledge unit, of the at least one elementary knowledge unit in at least one instance of articulations.

12. The method of claim 1, further comprising:
    isolating, out of the textual corpus, at least one textual sub-corpus;
    querying, for at least one elementary knowledge unit, the semantic relationship of the textual sub-corpus to the at least one elementary knowledge unit,
       the semantic relationship being one of affirmation, absence of affirmation, denial, absence of denial, augmentation, and absence of augmentation; and,
    compiling, for the at least one elementary knowledge unit, the semantic relationship identified in the querying of the textual sub-corpus.

13. The method of claim 1, further comprising:
    defining at least first and second degrees of constellations of other elementary knowledge units interrelated with at least one elementary knowledge unit based on at least one of a number of occurrences of other elementary knowledge units, and the relative proximity to other elementary knowledge units, of the at least one elementary knowledge unit in the textual corpus.

14. The method of claim 1, further comprising at least one of:
   storing the generated systematized body of knowledge; and,
   storing at least one elementary knowledge unit paired with bibliographic information associated with at least one instance of articulations in which the at least one elementary knowledge unit is present.

15. The method of claim 1, further comprising at least one of:
   including as the knowledge constraint at least one of subject matter, time period, aspect of instance of articulation, author, publisher, and language; and,
   defining a new body of knowledge from the body of knowledge based on adding at least one other knowledge constraint.

16. The method of claim 1, further comprising:
   requesting a learner to articulate a first elementary knowledge unit in the systematized body of knowledge; and,
   receiving from the learner a first response to the request.

17. The method of claim 16, further comprising:
   determining whether the first elementary knowledge unit is present in the first response;
   requesting the learner to rearticulate the first elementary knowledge unit, when the first elementary knowledge unit is determined to not be present; and,
   requesting the learner to articulate a second elementary knowledge unit, when the first elementary knowledge unit is determined to be present, where the second knowledge unit is also included in the systematized body of knowledge.

18. The method of claim 16, where requesting includes:
   generating at least one instance of natural language; and
   analyzing at least one instance of natural language received from the learner and at least one of:
      pairing at least one feature of natural language with at least one other identifier of the learner,
      issuing at least one instance of natural language where the verbalization is adapted in reference to the at least one other identifier,
      issuing at least one instance of natural language where the verbalization is directed by a conversational framework consisting of at least one conversational plot that is centered on at least one of imparting systematized the body of knowledge to the learner and assessing the learner's mastery of the body of knowledge, and
      issuing at least one instance of natural language and identifying as not being human.

19. A system for generating a systematized body of knowledge comprising:
   a memory; and,
   at least one processor to:
      define a body of knowledge by at least one knowledge constraint, the body of knowledge being a set of elementary knowledge units related to the at least one knowledge constraint and the at least one knowledge constraint including at least one subject;
      obtain a plurality of instances of articulations meeting the knowledge constraint;
      form a textual corpus from the plurality of instances of articulations;
      identify elementary knowledge units in the textual corpus,
         the elementary knowledge units being statements of knowledge in the textual corpus that convey knowledge related to the body of knowledge; and
      generate a systematized body of knowledge by inventorying the identified elementary knowledge units, the inventory including at least one of number of occurrences of each elementary knowledge unit in the textual corpus and relative proximity of each elementary knowledge unit to other elementary knowledge units in the textual corpus.

20. A non-transitory computer readable medium storing instructions for generating a systematized body of knowledge, the instructions comprising:
   one or more instructions which, when executed by one or more processors, cause the one or more processors to:
      define a body of knowledge by at least one knowledge constraint, the body of knowledge being a set of elementary knowledge units related to the at least one knowledge constraint and the at least one knowledge constraint including at least one subject;
      obtain a plurality of instances of articulations meeting the knowledge constraint;
      form a textual corpus from the plurality of instances of articulations;
      identify elementary knowledge units in the textual corpus,
         the elementary knowledge units being statements in the textual corpus that convey knowledge related to the body of knowledge; and
      generate a systematized body of knowledge by inventorying the identified elementary knowledge units, the inventory including at least one of number of occurrences of each elementary knowledge unit in the textual corpus and relative proximity of each elementary knowledge unit to other elementary knowledge units in the textual corpus.

* * * * *